(12) United States Patent
Fritz et al.

(10) Patent No.: US 9,991,645 B2
(45) Date of Patent: Jun. 5, 2018

(54) CELL CONTACT-MAKING SYSTEM FOR AN ELECTROCHEMICAL DEVICE

(71) Applicant: ElringKlinger AG, Dettingen (DE)

(72) Inventors: Wolfgang Fritz, Metzingen (DE); Stefan Kazmaier, Kirchheim (DE)

(73) Assignee: ElringKlinger AG, Dettingen (DE)

( * ) Notice: Subject to any disclaimer, the term of this patent is extended or adjusted under 35 U.S.C. 154(b) by 370 days.

(21) Appl. No.: 14/920,526

(22) Filed: Oct. 22, 2015

(65) Prior Publication Data
US 2016/0043446 A1 Feb. 11, 2016

Related U.S. Application Data

(63) Continuation of application No. PCT/EP2014/057137, filed on Apr. 9, 2014.

(30) Foreign Application Priority Data

Apr. 23, 2013 (DE) .................. 10 2013 207 357

(51) Int. Cl.
*H01R 13/66* (2006.01)
*H01M 2/30* (2006.01)
(Continued)

(52) U.S. Cl.
CPC ...... *H01R 13/6608* (2013.01); *B60L 11/1879* (2013.01); *H01M 2/204* (2013.01); *H01M 2/206* (2013.01); *H01M 2/305* (2013.01); *H01M 10/425* (2013.01); *H01M 10/441* (2013.01); *H01M 10/48* (2013.01);
(Continued)

(58) Field of Classification Search
CPC ................................................. H01R 13/6608
See application file for complete search history.

(56) References Cited

U.S. PATENT DOCUMENTS

| 4,920,019 | A | 4/1990 | Stoklosa et al. |
| 9,269,946 | B2 | 2/2016 | Lee |

(Continued)

FOREIGN PATENT DOCUMENTS

| AT | 511119 | 9/2012 |
| DE | 10 2007 020 295 | 11/2008 |

(Continued)

*Primary Examiner* — James Harvey
(74) *Attorney, Agent, or Firm* — Womble Bond Dickinson (US) LLP

(57) ABSTRACT

In order to provide a cell contact-making system for an electrochemical device which includes a plurality of electrochemical cells, wherein the cell contact-making system includes a current conductor system having one or more cell connectors, for electrically conductively connecting cell terminals of different electrochemical cells, a signal conductor system having one or more signal conductors for electrically conductively connecting a respective signal source to a signal conductor terminal connector of the cell contact-making system, and a monitoring unit for monitoring signals from the signal sources, which is of compact construction and is assemblable from a relatively small number of parts, it is proposed that the monitoring unit should include a plug contact terminal connector which is directly connectable by a plug connection to the signal conductor terminal connector of the signal conductor system.

15 Claims, 25 Drawing Sheets

(51) Int. Cl.

| | | |
|---|---|---|
| *H01M 10/42* | (2006.01) | |
| *H01M 10/48* | (2006.01) | |
| *B60L 11/18* | (2006.01) | |
| *H01M 2/20* | (2006.01) | |
| *H01M 10/44* | (2006.01) | |
| *H01R 13/645* | (2006.01) | |
| *H01R 12/70* | (2011.01) | |
| *H01M 2/10* | (2006.01) | |

(52) U.S. Cl.
CPC ... *B60L 2240/545* (2013.01); *B60L 2240/547* (2013.01); *B60L 2240/549* (2013.01); *H01M 2/1077* (2013.01); *H01M 2010/4278* (2013.01); *H01R 12/7076* (2013.01); *H01R 13/6456* (2013.01); *Y02T 10/7005* (2013.01); *Y02T 10/705* (2013.01)

(56) References Cited

U.S. PATENT DOCUMENTS

| | | |
|---|---|---|
| 9,461,342 B2 | 10/2016 | Saigo et al. |
| 9,466,862 B2 | 10/2016 | Aoki |
| 2006/0019155 A1 | 1/2006 | Seman, Jr. et al. |
| 2011/0097618 A1 | 4/2011 | Hauck et al. |
| 2012/0323511 A1 | 12/2012 | Saigo et al. |
| 2012/0328919 A1 | 12/2012 | Laderer et al. |
| 2013/0002016 A1 | 1/2013 | Furukawa et al. |
| 2013/0029192 A1 | 1/2013 | Oya |
| 2013/0244499 A1 | 9/2013 | Heck et al. |
| 2014/0077819 A1 | 3/2014 | Stark |
| 2016/0043446 A1* | 2/2016 | Fritz ............. H01M 2/305 429/90 |
| 2017/0133656 A1* | 5/2017 | Roemer ............. H01M 2/206 |
| 2017/0271642 A1* | 9/2017 | Groshert ............. H01M 2/202 |

FOREIGN PATENT DOCUMENTS

| | | |
|---|---|---|
| DE | 10 2010 023 934 | 12/2011 |
| DE | 10 2012 209 615 | 12/2012 |
| DE | 10 2011 079 895 | 1/2013 |
| DE | 10 2012 205 020 | 10/2013 |
| EP | 2 565 957 | 3/2013 |
| EP | 2 605 028 | 6/2013 |
| EP | 2 672 284 | 12/2013 |
| WO | WO 2008/018714 | 2/2008 |
| WO | WO 2010/031856 | 3/2010 |
| WO | WO 2012/011237 | 1/2012 |

* cited by examiner

CELL CONTACT-MAKING SYSTEM FOR AN ELECTROCHEMICAL DEVICE

CROSS-REFERENCE TO RELATED APPLICATIONS

The present application is a continuation of international application number PCT/EP2014/057137 filed on Apr. 9, 2014, which claims priority to German patent application number 10 2013 207 357.7 filed Apr. 23, 2013, the entire specification of both being incorporated herein by reference.

FIELD OF THE DISCLOSURE

The present invention relates to a cell contact-making system for an electrochemical device which includes a plurality of electrochemical cells, wherein the cell contact-making system includes a current conductor system having one or more cell connectors, for electrically conductively connecting cell terminals of different electrochemical cells, a signal conductor system having one or more signal conductors for electrically conductively connecting a respective signal source to a signal conductor terminal connector of the cell contact-making system, and a monitoring unit for monitoring signals from the signal sources.

A cell contact-making system of this kind serves on the one hand to enable a power current to flow from and to the electrochemical cells of the electrochemical device, by means of the current conductor system, and on the other to perform individual cell monitoring for physical measured variables such as voltage and temperature, by means of the signal conductor system and the monitoring unit. For this purpose, potential differences for example are measured between different cell connectors, and/or temperatures in the vicinity of the cell connectors are detected by means of suitable temperature sensors. The signal sources or measuring points are electrically conductively connected by the signal conductor system to the signal conductor terminal connector, which serves as the interface with the monitoring unit of the electrochemical device.

BACKGROUND

In the case of known cell contact-making systems, the monitoring unit is arranged spatially distanced from the signal conductor terminal connector of the signal conductor system, and is connected to the signal conductor terminal connector by way of a connection cable.

SUMMARY OF THE INVENTION

The object of the present invention is to provide a cell contact-making system having a monitoring unit which is of the type mentioned in the introduction and is of compact construction and is assemblable from a relatively small number of parts.

This object is achieved according to the invention with a cell contact-making system having the features of the pre-characterizing clause of claim 1 in that the monitoring unit includes a plug contact terminal connector which is directly connectable by a plug connection to the signal conductor terminal connector of the signal conductor system.

The solution according to the invention is thus based on the concept of arranging the monitoring unit not at a spacing from the signal conductor terminal connector of the signal conductor system but in the immediate vicinity of the signal conductor terminal connector, with the result that a plug contact terminal connector of the monitoring unit is directly connectable by a plug connection to the signal conductor terminal connector of the signal conductor system without any need for an additional connection line or an additional connection cable or an additional plug connection to make an electrically conductive contact between the plug contact terminal connector of the monitoring unit and the signal conductor terminal connector of the signal conductor system.

As a result, the cell contact-making system including the monitoring unit may be of very compact and space-saving construction.

Further, by eliminating the cable connection between the monitoring unit and the signal conductor terminal connector of the signal conductor system there is a saving on components, with the result that the cell contact-making system according to the invention is also producible at particularly low cost.

The monitoring unit serves to monitor and evaluate the signals provided by the signal sources of the cell contact-making system, in particular electrical potentials and/or temperature data, in order that the operating condition of the electrochemical device can be determined at any time and any measures that become necessary, such as switching off the electrochemical device, can be taken.

For this purpose, it is particularly favorable if the monitoring unit includes a processor for electronically processing the signals provided by the signal sources.

A monitoring unit of this kind is also designated a BMU (battery management unit) or CSC (circuit supervisory controller).

The monitoring unit may be arranged for example inside a housing of the cell contact-making system which is preferably formed from a support element, which carries the current conductor system and the signal conductor system of the cell contact-making system, and a cover element fixed to the support element.

In this arrangement, the cover element is preferably releasably fixed to the support element so that the housing can be opened in a simple way and the monitoring unit can be removed for maintenance and/or repair purposes.

As an alternative thereto, it may also be provided for the monitoring unit to be arranged outside the housing of the cell contact-making system that is formed by the support element and the cover element, in a separate monitoring unit housing.

This monitoring unit housing may be produced as a separate component, separately from the housing of the cell contact-making system, and be fixable, preferably releasably, to the housing of the cell contact-making system.

As an alternative thereto, it may also be provided for a housing part of the monitoring unit housing to be made in one piece with a housing part of the housing of the cell contact-making system, in particular in one piece with a cover element of the cell contact-making system.

In a preferred embodiment of the cell contact-making system according to the invention, it is provided for the signal conductor terminal connector to include a signal plug or a signal socket and for the monitoring unit to include a signal socket that is complementary with the signal plug of the signal conductor terminal connector, or a signal plug that is complementary with the signal socket of the signal conductor terminal connector.

The plug contact terminal connector of the monitoring unit and the signal conductor terminal connector of the signal conductor system are intermateable, preferably without a terminal connector cable placed in between.

Further, it may be provided for the monitoring unit to include a signal terminal connector for connecting a connection line to a monitoring unit of another cell contact-making system or to a central monitoring device.

In a preferred embodiment of the invention, the signal conductor terminal connector of the signal conductor system includes a terminal connector housing, wherein at least one terminal connector pin is fixed to the terminal connector housing, for connecting a signal conductor of the signal conductor system.

In this case, it may in particular be provided for at least one terminal connector pin to take a curved form.

The angle of curvature may be for example approximately 90°. As a result, it is possible on the one hand to connect the terminal connector pin to a signal conductor of the signal conductor system that runs in a plane defined by a longitudinal direction of the cell contact-making system and a transverse direction of the cell contact-making system running perpendicular to this longitudinal direction, and on the other to bring it into contact with the plug contact terminal connector of the monitoring unit in a contact direction that extends perpendicular to the longitudinal direction and perpendicular to the transverse direction.

Further, it may be provided for the terminal connector housing of the signal conductor terminal connector to include a receptacle for a terminal connector housing of the plug contact terminal connector, wherein at least one terminal connector pin is fixed to the terminal connector housing of the plug contact terminal connector.

Conversely, it could also be provided for the terminal connector housing of the plug contact terminal connector to which at least one terminal connector pin is fixed to include a receptacle for the terminal connector housing of the signal conductor terminal connector.

If the cell contact-making system includes a support element that carries the current conductor system and the signal conductor system, it is preferably provided for the signal conductor terminal connector to be fixed to the support element.

Preferably, the signal conductor terminal connector is releasably fixed to the support element, for example being latched.

The signal conductor terminal connector is preferably a component produced separately from the support element.

If the cell contact-making system includes, in addition to the support element that carries the current conductor system and the signal conductor system, a cover element that is releasably fixed to the support element, then the current conductor system, the signal conductor system and the monitoring unit may be arranged at least partly, preferably substantially entirely, between the support element and the cover element. As a result, a particularly compact overall construction of the cell contact-making system is produced.

In order to enable the monitoring unit to be positioned in a desired position relative to the support element and/or the cover element, it is advantageous if the support element and/or the cover element include/includes at least one positioning element that engages with the monitoring unit.

In a particular embodiment of the invention, it is provided for the cell contact-making system to include a cover element that, in the assembled condition of the cell contact-making system, is arranged on the side of the current conductor system and the signal conductor system remote from the cell terminals of the electrochemical device.

In this case, it may be provided for the signal conductor terminal connector of the signal conductor system to extend at least partly through the cover element. This makes it possible to arrange the monitoring unit directly adjacent to the signal conductor terminal connector of the signal conductor system without the monitoring unit being located in the intermediate space between the cover element and the signal conductor system.

The monitoring unit may in particular be arranged in a monitoring unit housing.

A monitoring unit housing of this kind may take the form of an element that is produced separately from the cover element.

The monitoring unit housing may include a housing lower part and a housing upper part.

In this case, it may in particular be provided for the housing lower part of the monitoring unit housing to be formed in one piece with the cover element.

Further features and advantages of the invention form the subject matter of the description below and the illustration in the drawings of exemplary embodiments.

BRIEF DESCRIPTION OF THE DRAWINGS

Like or functionally equivalent elements are designated by the same reference numerals in all the Figures.

DETAILED DESCRIPTION OF THE INVENTION

Figure 1:
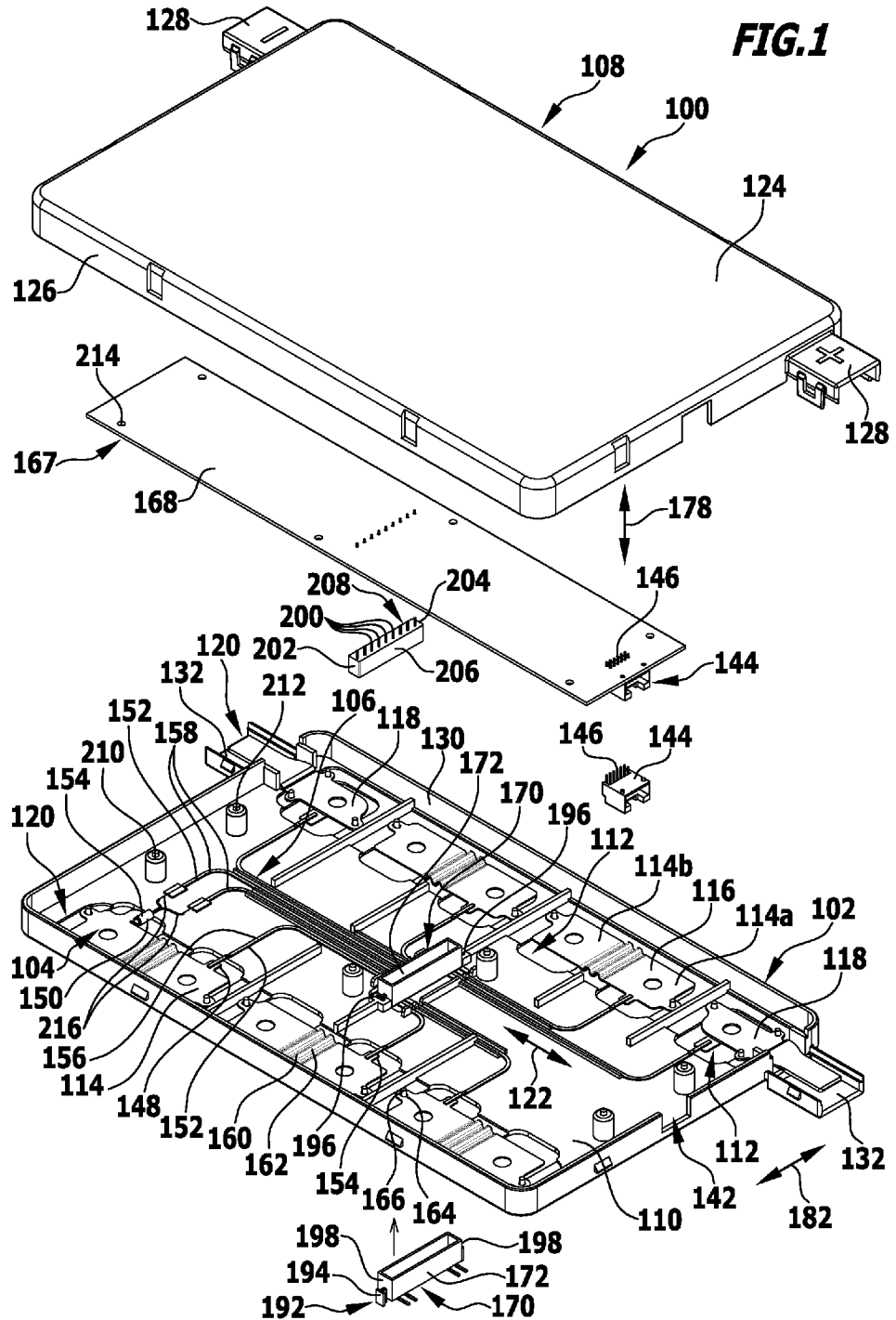
FIG. 1 shows a perspective exploded illustration of a cell contact-making system for an electrochemical device, in particular a battery module, which includes a support element, a current conductor system that is held on the support element and a signal conductor system that is held on the support element, a cover element and a monitoring unit that is arranged between the cover element and the support element, for monitoring signals from signal sources of the cell contact-making system.

A cell contact-making system that is illustrated in FIGS. 1 to 6 and is designated 100 as a whole includes a support element 102, on which a current conductor system 104 and a signal conductor system 106 are held, a cover element 108 that is placeable on the support element 102, and a monitoring unit 167 which is arranged in the intermediate space between the support element 102 and the cover element 108, for monitoring signals that are transmitted by way of the signal conductor system 106 to the monitoring unit 167.

The support element 102 is placeable on a housing 109 (illustrated in FIG. 7) of an electrochemical device 111, for example a battery module, having a plurality of electrochemical cells 113, in particular battery cells, and in the assembled condition of the electrochemical device 111 closes off an upper housing opening through which cell terminals 115 of the electrochemical cells 113 of the electrochemical device 111 project.

The support element 102 may for example take the form of a preferably substantially rectangular support plate 110.

The support element 102 is provided with a plurality of passage openings 112, wherein each passage opening 112 is allocated on the one hand to a respective contact region 114 of a cell connector 116 or current terminal connector 118 and on the other to a respective cell terminal 115 of the electrochemical cells 113 of the electrochemical device 111, with the result that a respective cell terminal 115 is connectable, through a passage opening 112 of this kind, to an allocated contact region 114 of a cell connector 116 or current terminal connector 118.

In this arrangement, a cell terminal 115 may for example extend through the passage opening 112 in order to come into contact with a contact region 114 of a cell connector 116 or current terminal connector 118.

As an alternative thereto, a contact region 114 of a cell connector 116 or current terminal connector 118 may also extend through the respectively associated passage opening 112 in order to come into contact with the respectively associated cell terminal 115.

Further, it is also conceivable for both the cell terminal 115 and also the contact region 114 of the cell connector 116 or current terminal connector 118 to extend into the passage opening 112 and to be connected to one another there.

Figure 2:
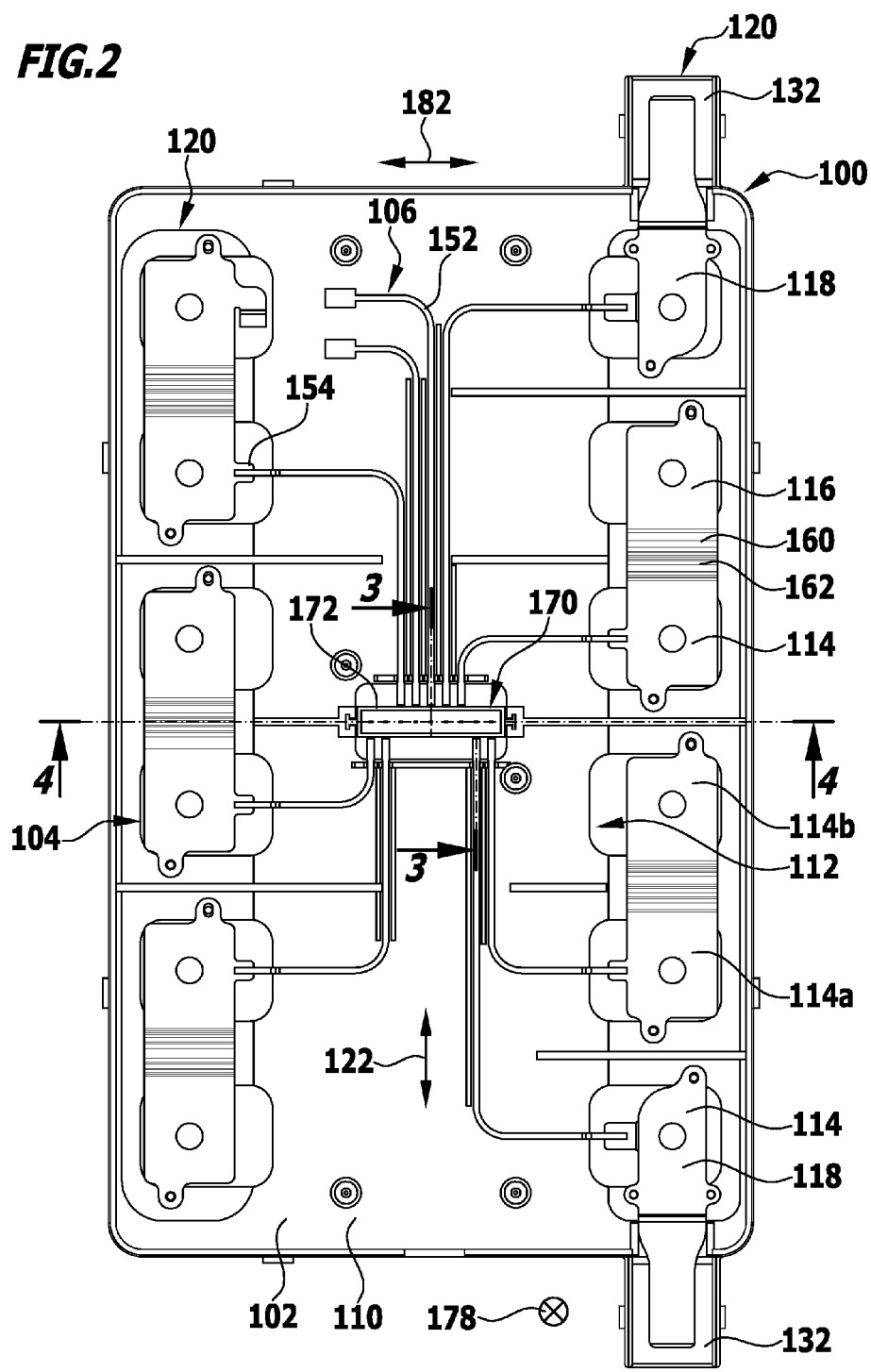
FIG. 2 shows a plan view from above of the support element, the current conductor system and the signal conductor system from FIG. 1.

As can be seen from FIGS. 1 and 2, the passage openings 112 of the support element 102 may be arranged in a plurality of rows 120, wherein the rows 120 extend for example in a longitudinal direction 122 of the support element 102.

The passage openings 112 may in particular take a substantially rectangular form, in particular with rounded corner regions; in principle, however, other shapes of the passage openings 112, in particular circular, oval, square or polygonal passage openings 112, are also possible.

The cover element 108, which serves to cover the current conductor system 104 and the signal conductor system 106, is arranged on the upper side of the support element 102, in the assembled condition of the cell contact-making system 100 remote from the electrochemical cells 113.

The cover element 108 for example takes the form of a substantially rectangular cover plate 124.

Figure 6:
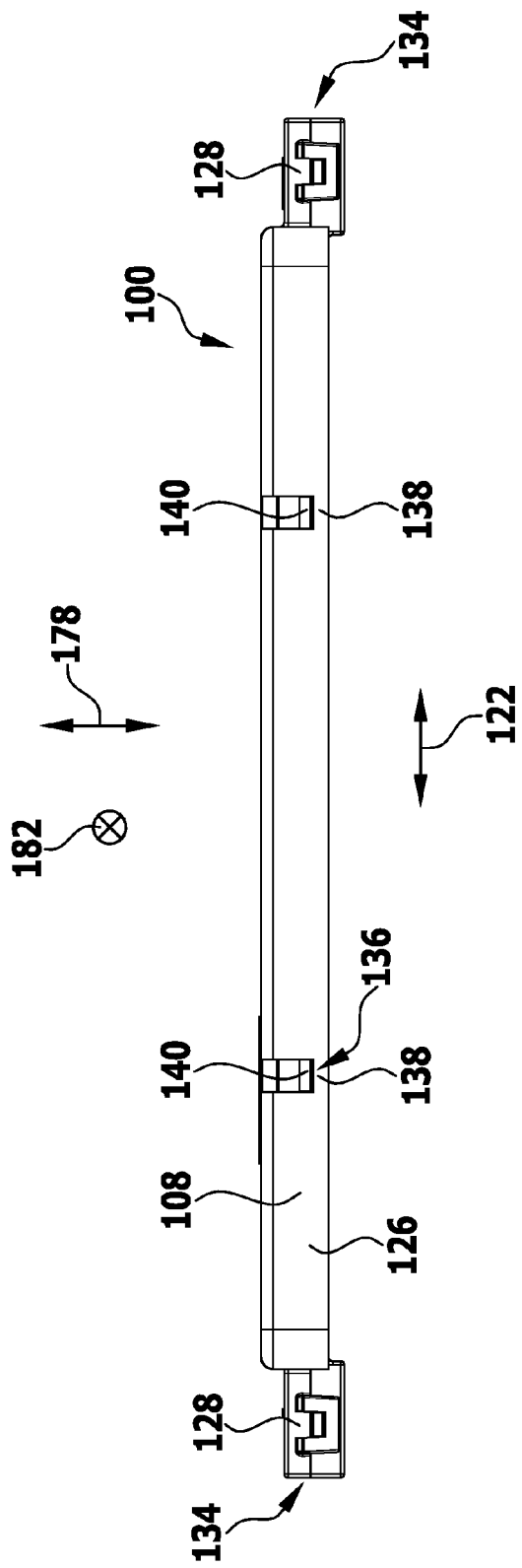
FIG. 6 shows a side view of the cell contact-making system from FIG. 5, with the direction of view in the direction of the arrow 6 in FIG. 5.

As can best be seen from FIGS. 1 and 6, the cover element 108 is further preferably provided with an edge region 126 which runs peripherally along an outer edge and in the assembled condition of the cell contact-making system 100 projects towards the support element 102.

The edge region 126 of the cover element 108 may be interrupted by two passage channels 128 which project forwards or backwards from the edge of the cover element 108, preferably in the longitudinal direction 122, and may for example have a substantially U-shaped cross section.

As can best be seen from FIG. 1, the support element 102 is also preferably provided with an edge region 130 which runs peripherally along an outer edge and in the assembled condition of the cell contact-making system 100 projects towards the cover element 108.

The edge region 130 of the support element 102 may also be interrupted by two passage channels 132 which project forwards or backwards from the edge of the support element 102, preferably in the longitudinal direction 122, and may for example have a substantially U-shaped cross section.

The passage channels 132 of the support element 102 and the passage channels 128 of the cover element 108 are arranged at mutually corresponding points on the respective edge regions 130 and 126 and face one another by means of their open sides, with the result that the passage channels 132, 128 together form a respective passage duct 134 which serves to receive a respective one of the current terminal connectors 118 of the cell contact-making system 100.

The current terminal connectors 118 and the cell connectors 116, by means of which the cell terminals 115 of in each case two mutually adjacent electrochemical cells 113 of different polarity are electrically conductively connectable to one another, together form the current conductor system 104 of the cell contact-making system 100.

The current conductor system 104 serves to enable current to flow between the electrochemical cells 113 of the electrochemical device 111 and to or from the current terminal connectors 118 of the cell contact-making system 100.

As a result of this current conductor system 104, for example the electrochemical cells 113 of the electrochemical device 111 are connected electrically in series.

Figure 7:
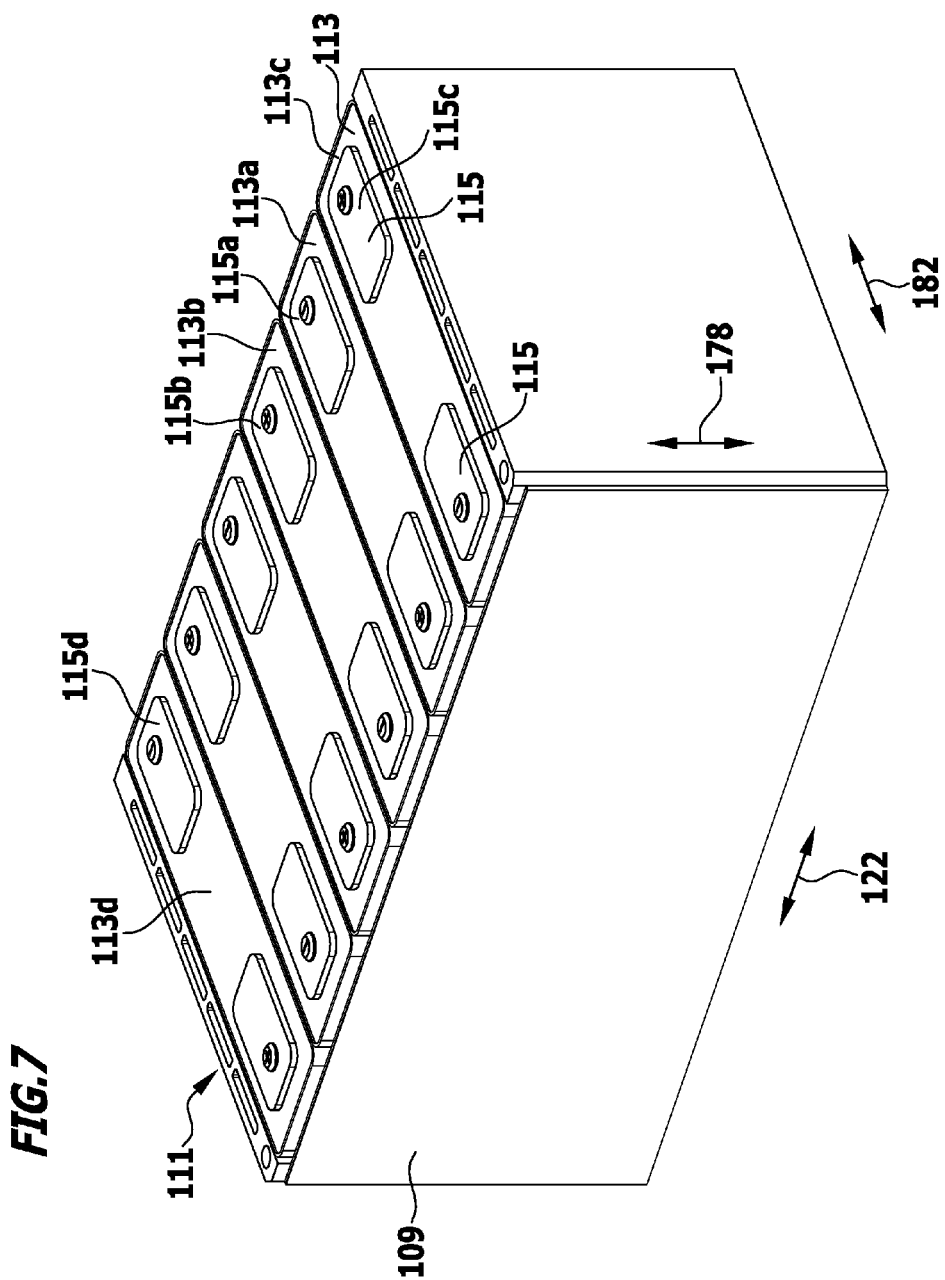
FIG. 7 shows a perspective illustration of an electrochemical device, for example a battery module, having a housing and a plurality of electrochemical cells arranged therein, wherein the cell contact-making system is placeable on the housing and is electrically conductively connectable to cell terminals of the electrochemical cells.
Figure 8:
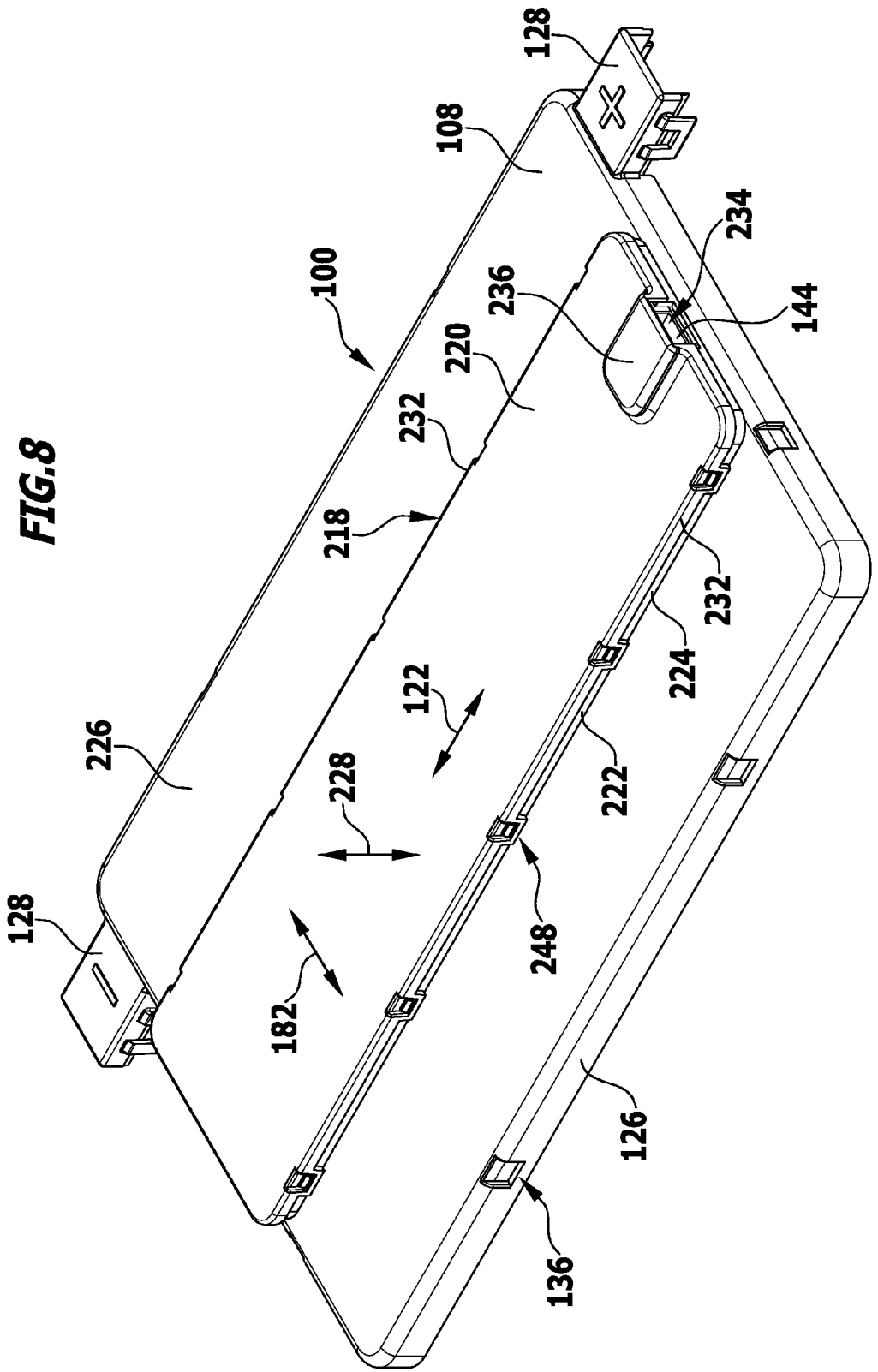
FIG. 8 shows a perspective illustration of a second embodiment of the cell contact-making system, in which the monitoring unit is arranged outside the intermediate space between the support element and the cover element, in a housing whereof the housing lower part is formed in one piece with the cover element.
Figure 9:
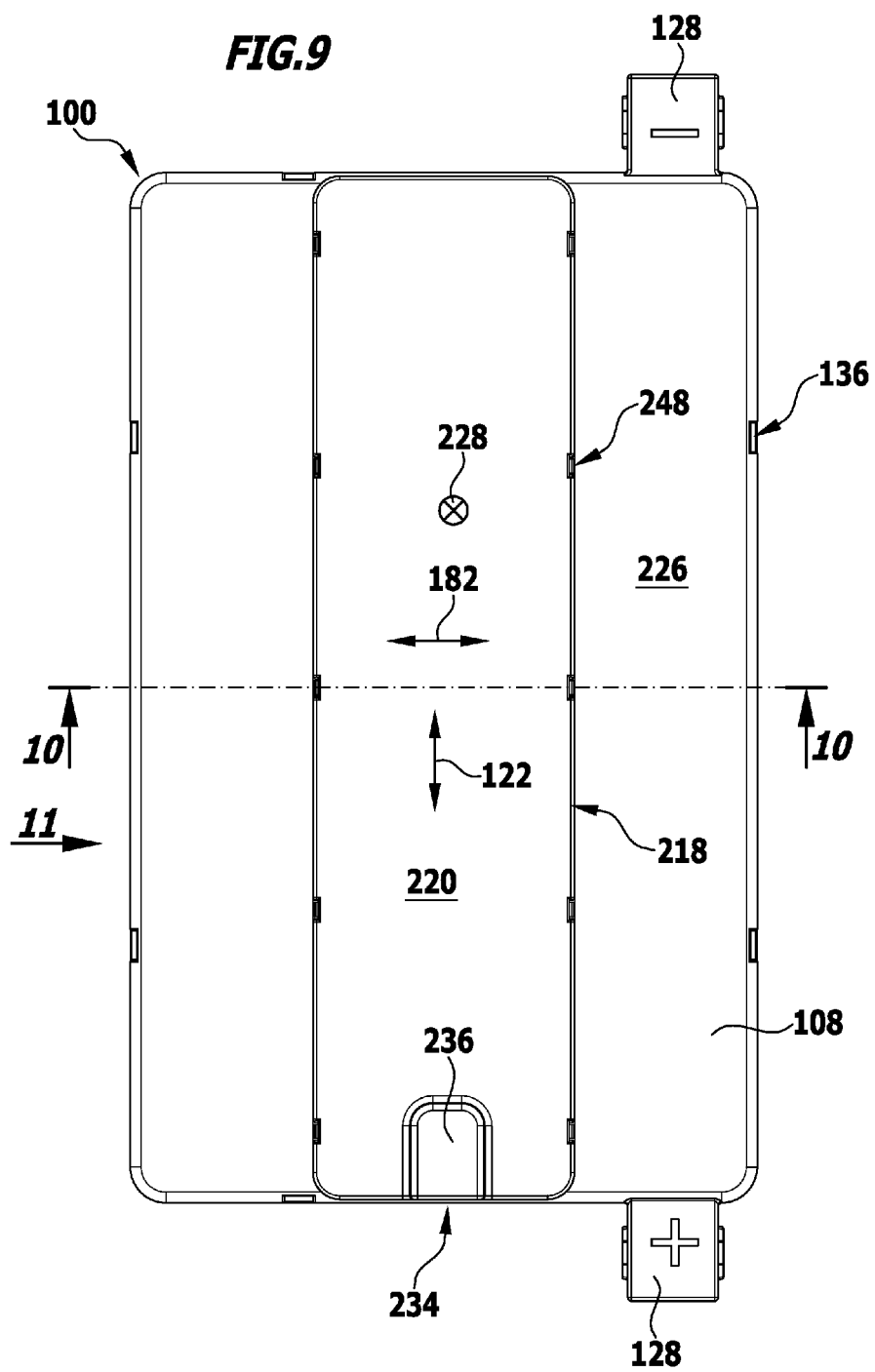
FIG. 9 shows a plan view from above of the cell contact-making system from FIG. 8.

In this arrangement, each cell connector 116 connects a first cell terminal 115a, of negative polarity, of a first electrochemical cell 113a to a second cell terminal 115b, of positive polarity, of an adjacent second electrochemical cell 113b (see FIG. 7).

In each case, a cell terminal 115c of the electrochemical cell 113c that forms the start of the cell series circuit of the electrochemical device, and a cell terminal 115d of the electrochemical cell 113d that forms the end of the cell series circuit, are electrically conductively connected to one of the electrically conductive current terminal connectors 118 of the cell contact-making system 100.

A plurality of electrochemical devices 111 each having a cell contact-making system 100 are preferably connected electrically in series.

A series circuit of this kind may in particular be produced in that a current terminal connector 118 of a first electrochemical device 111 is electrically conductively connected, by means of a module connector (not illustrated), to an electrical current terminal connector 118 (of the opposite polarity) of a second electrochemical device 111.

So that the cover element 108 may be releasably fixed to the support element 102, there is preferably provided a latching device 136 that includes one or more latching elements 138 provided on the cover element 108 and one or more latching elements 140 provided on the support element 102.

The latching elements 138 on the cover element and the latching elements 140 on the support element are arranged at mutually corresponding points on the edge region 126 of the cover element 108 and the edge region 130 of the support element 102 respectively and latch to one another when the cover element 108 is placed on the support element 102, with the result that the cover element 108 is held releasably on the support element 102 by means of the latching device 136.

The support element 102 is preferably provided, on its edge region 130, with one or more terminal connector recesses 142 through which a respective signal terminal connector 144 (see in particular FIG. 1) having a plurality of terminal connector pins 146 is accessible from outside the cell contact-making system 100 for making contact with a signal conductor element that is complementary with the signal terminal connector 144.

The signal terminal connector 144 may for example take the form of a signal conductor plug.

In this case, the signal conductor element, which takes a form complementary with the signal terminal connector 144, preferably takes the form of a signal socket.

The signal terminal connector 144 serves to connect the monitoring unit 167 that is arranged on the support element 102 to a central monitoring device (not illustrated) or to the monitoring unit 167 of another cell contact-making system 100 (not illustrated) by way of a preferably multiple-pole connection line (not illustrated).

In FIG. 1, the signal terminal connector 144 is shown twice for reasons of illustration: once in a position assembled on the monitoring unit 167, and once in a position released from the monitoring unit 167.

The signal conductor system 106 serves to connect one or more voltage tapping points 148 to a respective cell connector 116 or current terminal connector 118 and/or to connect one or more temperature sensors 150 of the cell contact-making system 100 to the monitoring unit 167.

The signal conductor system 106 includes one or more signal conductors 152 that electrically conductively connect a respective signal source 154 to the signal conductor terminal connector 170.

If the signal source 154 is a voltage tapping point 148 on a cell connector 116 or current terminal connector 118, then this signal source 154 is connected to the signal conductor terminal connector 170 by way of a voltage tapping conductor 156.

The voltage tapping points 148 are connected to a respective contact region 114 of a cell connector 116 or current terminal connector 118 of the cell contact-making system 100, in order to be able to tap the electrical potential respectively prevailing there.

If the signal source 154 is a temperature sensor 150, the signal source 154 is electrically conductively connected to the signal conductor terminal connector 170 by means of one or more temperature measuring conductors 158.

The temperature sensors 150 are preferably also in contact with a contact region 114 of a cell connector 116 or current terminal connector 118 of the cell contact-making system 100, in order to be able to measure the temperature prevailing there.

Each of the contact regions 114 of the cell connectors 116, and each current terminal connector 118, is allocated to a respective cell terminal 115 of the electrochemical device 111 and, in the assembled condition of the electrochemical device 111, is electrically conductively connected, preferably by a substance-to-substance bond, to the respectively associated cell terminal 115.

Each cell connector 116 includes two contact regions 114, for making electrical contact with a respective cell terminal 115, and a compensation region 160 that connects the two contact regions 114 to one another. The compensation region 160 is preferably elastically and/or plastically deformable in order to enable a relative movement of the two contact regions 114 of the cell connector 116 in relation to one another during operation of the electrochemical device 111 and/or for the compensation of tolerances when the cell contact-making system 100 is assembled.

For this purpose, the compensation region 160 may in particular have one or more compensation corrugations 162, which run transversely to a connection direction that connects a center of the first contact region 114a and a center of the second contact region 114b of the cell connector 116 to one another.

Each contact region 114 of a cell connector 116 or current terminal connector 118 may be positioned, by means of a respective positioning hole 164, on a respectively allocated positioning pin 166 on the support element 102.

In this arrangement, the positioning pin 166 on the support element 102 preferably passes through the respectively associated positioning hole 164 in the cell connector 116 or current terminal connector 118.

The support element 102 and/or the cover element 108 is/are preferably made from an electrically non-conductive synthetic material, for example PBT (polybutylene terephthalate), PP (polypropylene), PA (polyamide), ABS (acrylonitrile butadiene styrene) and/or LCP (liquid crystal polymer), and is preferably formed substantially entirely from a synthetic material of this kind.

A particularly suitable material for the support element 102 and/or the cover element 108 is/are a polypropylene material with talcum filler (for example the material designated PP TV20). As a result of the talcum filler, this material has particularly good dimensional stability.

The signal conductors 152 of the signal conductor system 106 lead to a signal conductor terminal connector 170 of the signal conductor system 106 that is preferably arranged substantially centrally on the support element 102.

Figure 3:
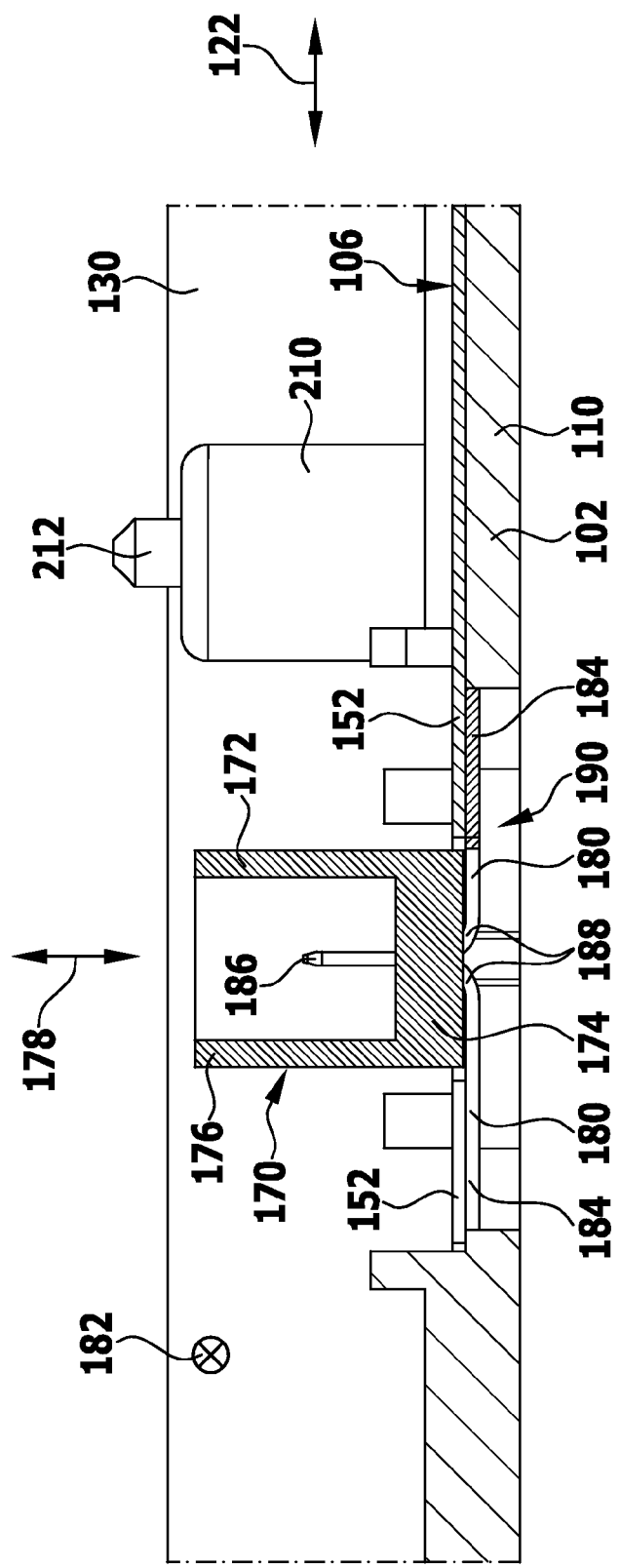
FIG. 3 shows a schematic section through the cell contact-making system from FIG. 2, along the line 3-3 in FIG. 2.

As can best be seen from the cross section of FIG. 3, the signal conductor terminal connector 170 includes a terminal connector housing 172 having a base wall 174 and, carried by the base wall 174, side walls 176 that extend in a contact direction 178 from the base wall 174 in the direction of the monitoring unit 167.

The contact direction 178 preferably runs substantially perpendicular to the longitudinal direction 122 of the support element 102, substantially perpendicular to a transverse direction 182 of the support element 102 (which for its part runs perpendicular to the longitudinal direction 122 of the support element) and substantially parallel to the direction in which the cell terminals 115 of the electrochemical cells 113 of the electrochemical device 111 extend towards the cell connectors 116 and current terminal connectors 118 of the current conductor system 104.

The terminal connector housing 172 of the signal conductor terminal connector 170 is preferably formed from an electrically insulating material, in particular a synthetic material.

For example, the terminal connector housing 172 may be formed from PBT (polybutylene terephthalate), PP (polypropylene), PA (polyamide), ABS (acrylonitrile butadiene styrene) and/or LCP (liquid crystal polymer).

The terminal connector housing 172 may for example be produced as an injection molded part.

Further, the signal conductor terminal connector 170 includes a respective terminal connector pin 180 for each signal conductor 152, and this terminal connector pin 180 extends through the terminal connector housing 172, in particular the base wall 174 thereof, and is held at the terminal connector housing 172.

In particular, it may be provided for the terminal connector pins 180 to be molded inside the terminal connector housing 172 in certain regions.

Each of the terminal connector pins 180 takes a preferably substantially angular form and includes a terminal connector portion 184, which is aligned substantially parallel to an end region of the respectively associated signal conductor 152, and a contact portion 186, which is aligned substantially parallel to the contact direction 178 and hence substantially perpendicular to the terminal connector portion 184.

The terminal connector portion 184 and the contact portion 186 of each terminal connector pin 180 are connected to one another by a curved portion 188.

The overall angle of curvature of the curved portion 188 is preferably substantially 90°.

The terminal connector portions 184 of the signal conductor terminal connector 170 are preferably connected by a substance-to-substance bond to the end regions of the respectively associated signal conductors 152, for example by welding, in particular by ultrasound welding, and/or by soldering.

The signal conductor terminal connector 170 is preferably arranged at a passage opening 190 in the support element 102 which is large enough to allow the terminal connector housing 172 and the terminal connector pins 180 arranged thereon to pass through, with the result that the signal conductor terminal connector 170 can be introduced into the intermediate space between the support element 102 and the monitoring unit 167 from the side of the support element 102 remote from the monitoring unit 167, through the passage opening 190, until the terminal connector portions 184 of the terminal connector pins 180 of the signal conductor terminal connector 170 abut against the end regions of the respectively associated signal conductors 152, as illustrated in FIG. 3.

The region of overlap of the terminal connector portions 184 and the signal conductors 152 is in this case accessible through the passage opening 190, with the result that the substance-to-substance bond between the terminal connector pins 180 and the end regions of the signal conductors 152 may be made through the passage opening 190.

Figure 4:
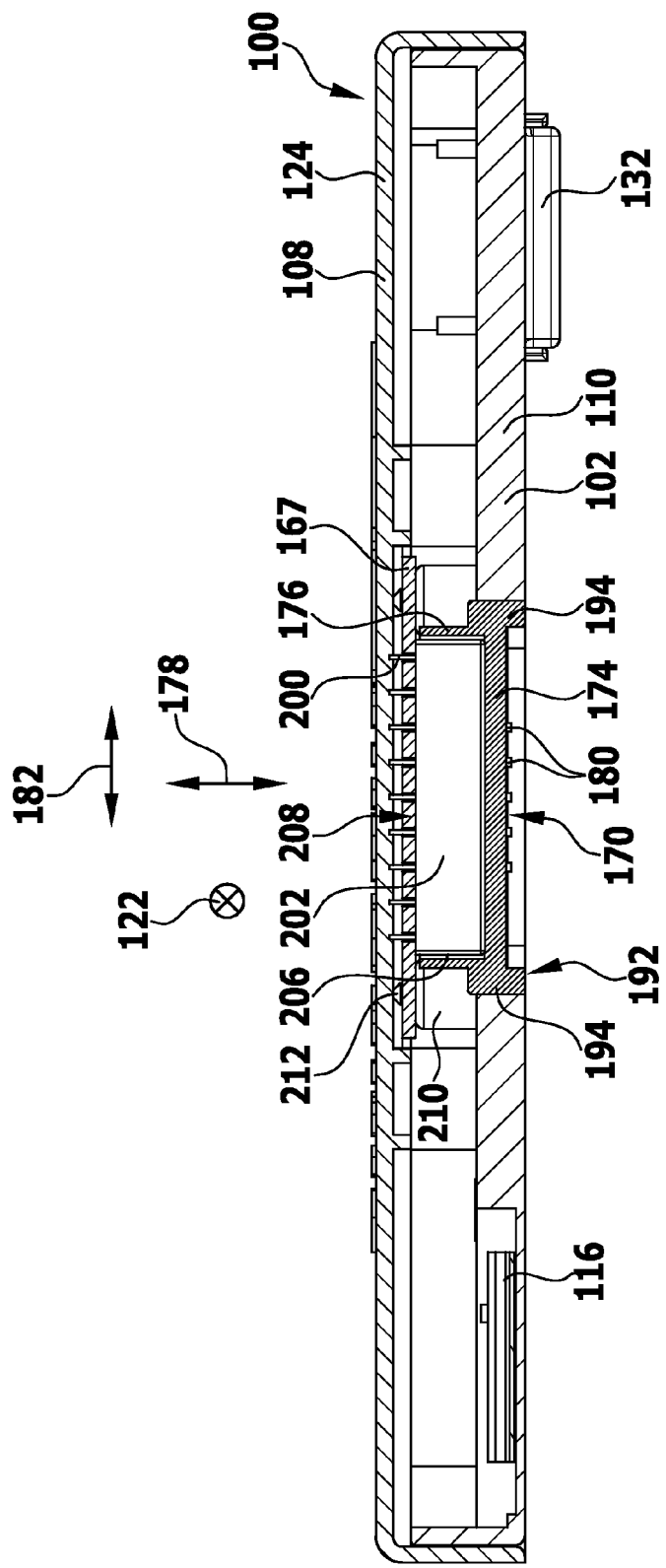
FIG. 4 shows a schematic cross section through the cell contact-making system, along the line 4-4 in FIG. 2, but with the monitoring unit assembled and with the cover element placed on the support element.
Figure 5:
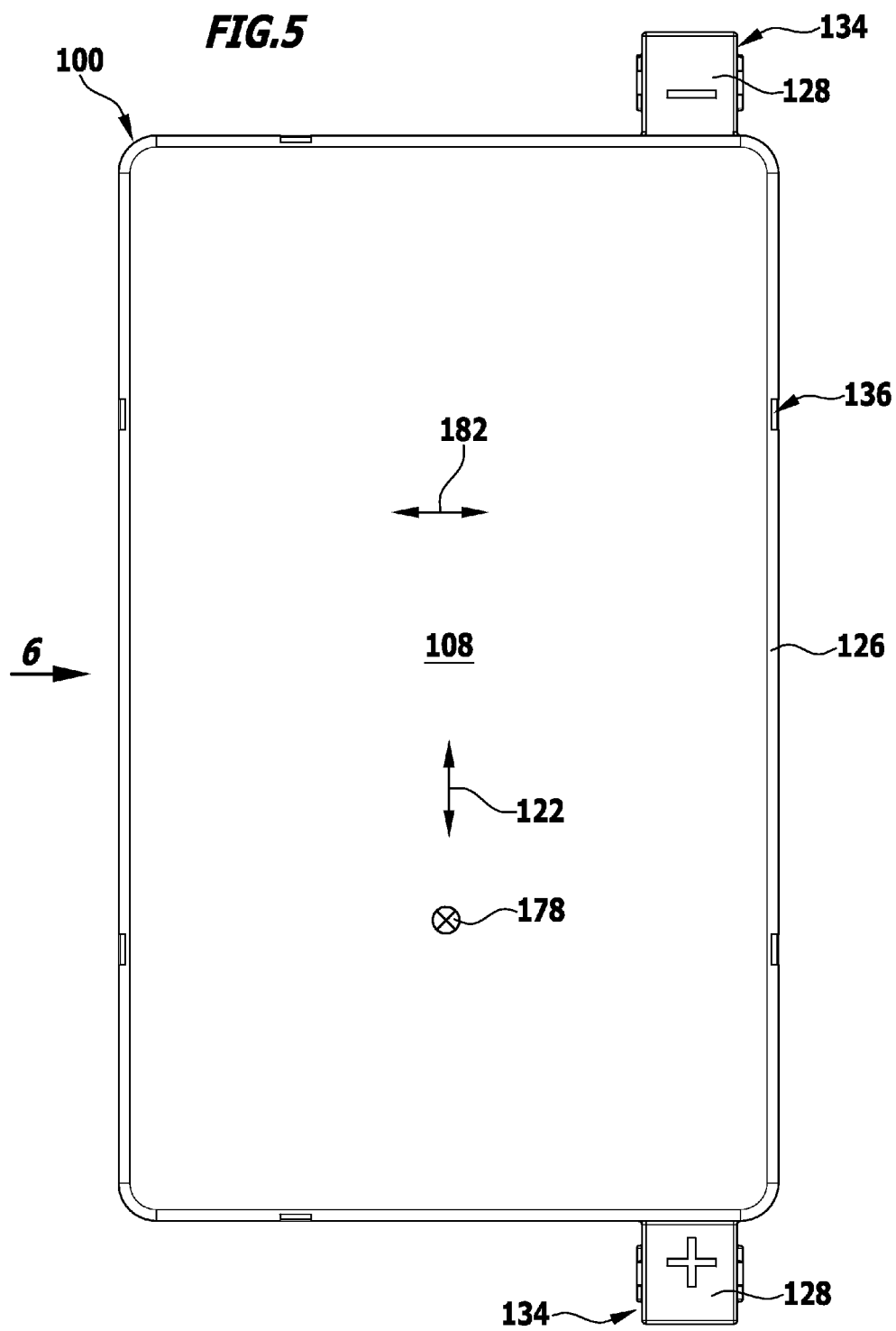
FIG. 5 shows a plan view from above of the cell contact-making system from FIGS. 1 to 4.

In this arrangement, the movement introducing the terminal connector housing 172 through the passage opening 190 in the contact direction 178 is preferably guided by means of a guiding device 192, which includes guide elements 194 on the terminal connector housing and guide elements 196, of a form complementary therewith, on the support element (see FIGS. 1 and 4).

The guide elements 194 on the terminal connector housing may in particular have an approximately T-shaped cross section and be arranged for example on mutually opposing end faces 198 of the terminal connector housing 172.

Once the terminal connector pins 180 have been connected by a substance-to-substance bond to the end regions of the signal conductors 152, the terminal connector housing 172 is held in its assembled position on the support element 102 by these substance-to-substance bonds.

As an alternative or in addition thereto, however, it is also possible to provide for the terminal connector housing 172 of the signal conductor terminal connector 170 to be held on the support element 102 with positive engagement, in particular by being latched.

The monitoring unit 167 includes a printed circuit board 168 having conductor tracks (arranged on the side facing the support element 102, and so not illustrated in the Figures) that are electrically conductively connected to a respective terminal connector pin 200 of the monitoring unit 167, for example by soldering.

These conductor tracks lead to the inputs of a processor (also arranged on the side of the printer circuit board 168 facing the support element 102, and so not illustrated in the Figures).

As can best be seen from FIGS. 1 and 4, each of the terminal connector pins 200 is held in a terminal connector housing 202 of the monitoring unit 167 such that, in the assembled condition of the cell contact-making system 100, the terminal connector pins 200 of the monitoring unit 167 extend substantially parallel to the contact direction 178.

The terminal connector housing 202 has a top wall 204, through which the terminal connector pins 200 extend, and side walls 206 that extend in the contact direction 178 from the top wall 204 towards the support element 102.

The terminal connector housing 202 is preferably formed from an electrically insulating material, in particular a synthetic material.

In particular, it may be provided for the terminal connector housing 172 to be formed from PBT (polybutylene terephthalate), PP (polypropylene), PA (polyamide), ABS (acrylonitrile butadiene styrene) and/or LCP (liquid crystal polymer).

The terminal connector housing 172 is preferably produced as an injection molded part.

The terminal connector pins 200 of the monitoring unit 167 and/or the terminal connector pins 180 of the signal conductor terminal connector 170 are formed from an electrically conductive material, for example copper or aluminum, a copper alloy or an aluminum alloy.

The terminal connector housing 202 of the monitoring unit 167 takes a form complementary with the terminal connector housing 172 of the signal conductor terminal connector 170 of the signal conductor system 106 such that the two terminal connector housings 172 and 202 are directly connectable to one another by a plug connection.

Preferably, in this arrangement, in the plugged-in condition the terminal connector housing 202 of the monitoring unit 167 is at least partly, preferably substantially entirely, received in the terminal connector housing 172 of the signal conductor terminal connector 170.

Conversely, it may also be provided in the plugged-in condition for the terminal connector housing 172 of the signal conductor terminal connector 170 to be at least partly, preferably substantially entirely, received in the terminal connector housing 202 of the monitoring unit 167.

The terminal connector housing 202 and the terminal connector pins 200 together form a plug contact terminal connector 208 of the monitoring unit 167.

Once the plug connection between the plug contact terminal connector 208 of the monitoring unit 167 on the one hand and the signal conductor terminal connector 170 of the signal conductor system 106 on the other has been made, the processor of the monitoring unit 167 is electrically conductively connected to the signal sources 154 of the cell contact-making system 100.

The plug connection between the plug contact terminal connector 208 and the signal conductor terminal connector 170 is releasable at any time by lifting the monitoring unit 167 off the support element 102 in the contact direction 178.

As an alternative or in addition thereto, for embedding the terminal connector pins 180 and/or 200 in the terminal connector housing 172 or the terminal connector housing 202 respectively, it may also be provided for the terminal connector pins 180 and 200 to be connected to the respective terminal connector housing 172 and 202 by a substance-to-substance bond in another way, for example by adhesion.

As an alternative or in addition thereto, it may also be provided for the terminal connector pins 180 and/or 200 respectively to be connected to the respectively allocated terminal connector housings 172 and 202 by force locking, in particular by press fit, and/or by positive engagement, in particular by being latched.

The monitoring unit 167 is preferably carried by positioning elements 210 that are arranged on the side of the support element 102 facing the monitoring unit 167.

The positioning elements 210 may in particular be formed in one piece with the support element 102.

Each positioning element 210 is provided with a positioning peg 212 that, in the assembled condition of the cell contact-making system 100, extends through a respectively allocated positioning opening 214 in the monitoring unit 167.

In this way, it is possible to position the monitoring unit 167 in a desired manner in the longitudinal direction 122 and in the transverse direction 182 relative to the support element 102.

The cell contact-making system 100 described above is preferably pre-assembled complete, as a separate assembly of the electrochemical device 111.

During this pre-assembly, the components of the current conductor system 104, in particular the cell connectors 116 and current terminal connectors 118, and one or more temperature sensors 150 and the signal conductors 152 of the signal conductor system 106, are positioned on the support element 102.

The terminal connector housing 172 of the signal conductor terminal connector 170 of the signal conductor system 106 is brought into its assembled position relative to the support element 102, through the passage opening 190 in the support element 102, in the contact direction 178, and the terminal connector pins 180 of the signal conductor terminal connector 170 are electrically conductively connected to the end regions of the signal conductors 152.

For the purpose of illustrating the assembly procedure, the signal conductor terminal connector 170 is illustrated twice in FIG. 1: once before assembly, and once in the position assembled on the support element 102.

The terminal connector housing 202 of the monitoring unit 167 is assembled on the printed circuit board 168 of the monitoring unit 167, wherein the terminal connector pins 200 of the plug contact terminal connector 208 are electrically conductively connected to the conductor tracks of the monitoring unit 167.

Then, a plug connection is made between the plug contact terminal connector 208 of the monitoring unit 167 and the signal conductor terminal connector 170 of the signal conductor system 106.

In this arrangement, the positioning elements 210 of the support element 102 are simultaneously brought into engagement with the positioning openings of the monitoring unit 167, with the result that the monitoring unit 167 adopts the desired position relative to the support element 102.

The ends of the signal conductors 152 remote from the signal conductor terminal connector 170 of the signal conductor system 106 are electrically conductively connected to the respectively associated signal sources 154, that is to say in particular to the voltage tapping points 148 of the cell connectors or current terminal connectors 118, or to a respective terminal connector element 216 of a temperature sensor 150.

Thus, all the components needed for making contact with the electrochemical cells 113 of the electrochemical device 111 are grouped into an assembly that is handlable as a unit, namely in the cell contact-making system 100, already in the required relative positions.

During assembly of the electrochemical device 111, the support element 102 is placed, with the current conductor system 104 and the signal conductor system 106 and the monitoring unit 167, on the housing 109 in which the electrochemical cells 113 are arranged, and is connected to the edge of the housing 109 that surrounds the housing opening.

Then, the cell connectors 116 and current terminal connectors 118 are brought into electrically conductive contact with the respectively associated cell terminals 115 of the electrochemical device 111, for example by a substance-to-substance bond, in particular by welding, and/or by positive engagement.

Once contact has been made between the current conductor system 104 and the cell terminals 115 of the electrochemical cells 113 of the electrochemical device 111, the cover element 108 is placed on the support element 102 and connected thereto, in particular by being latched, with the result that the cover element 108 covers the current conductor system 104, the signal conductor system 106 and the monitoring unit 167 of the cell contact-making system 100 and protects them from undesired contact.

This prevents damage to the current conductor system 104, the signal conductor system 106 and the monitoring unit 167 during transport and assembly of the electrochemical device 111.

The electrochemical device 111 that has been fully assembled can be grouped with a plurality of other electrochemical devices 111, in particular battery modules, to form an array of electrochemical devices, wherein in particular different electrochemical devices 111 can be joined together by means of module connectors (not illustrated) that connect the current terminal connectors 118 of different electrochemical devices 111 to one another.

The signal terminal connectors 144 of the monitoring units 167 of the different electrochemical devices 111 may also be connected to one another with a signal conductor element that is complementary therewith by way of a respective, preferably multiple-pole, connection line or be connected to a central monitoring device of the electrochemical device array.

During operation of the electrochemical device 111 or the electrochemical device array, the monitoring unit 167 of each cell contact-making system 100 makes it possible to monitor and evaluate the signals provided by the signal sources 154 of the respective cell contact-making system 100, in particular electrical potentials and/or temperature data, in order that the operating condition of the electrochemical device 111 can be determined at any time and any measures that become necessary, such as switching off the electrochemical device 111, can be taken.

For the purposes of maintenance and/or repair, the monitoring unit 167 can easily be removed from the respective cell contact-making system 100 in that the cover element 108 is removed from the support element 102 and then the plug connection between the plug contact terminal connector 208 of the monitoring unit 167 on the one hand and the signal conductor terminal connector 170 of the signal conductor system 106 on the other is released.

A second embodiment of the cell contact-making system 100, illustrated in FIGS. 8 to 16, differs from the first embodiment illustrated in FIGS. 1 to 7 in that in the case of the second embodiment the monitoring unit 167 is not arranged in the intermediate space between the support element 102 and the cover element 108 but in a monitoring unit housing 218 having a housing upper part 220 (see in particular FIG. 12) and a housing lower part 222 (see in particular FIG. 13), wherein the housing lower part 222 is formed in one piece with the cover element 108.

The housing lower part 222 in particular includes an edge region 224 that extends from an upper side 226 remote from the support element 102, in a vertical direction 228 that is perpendicular to the longitudinal direction 122 and to the transverse direction 182.

Figure 12:
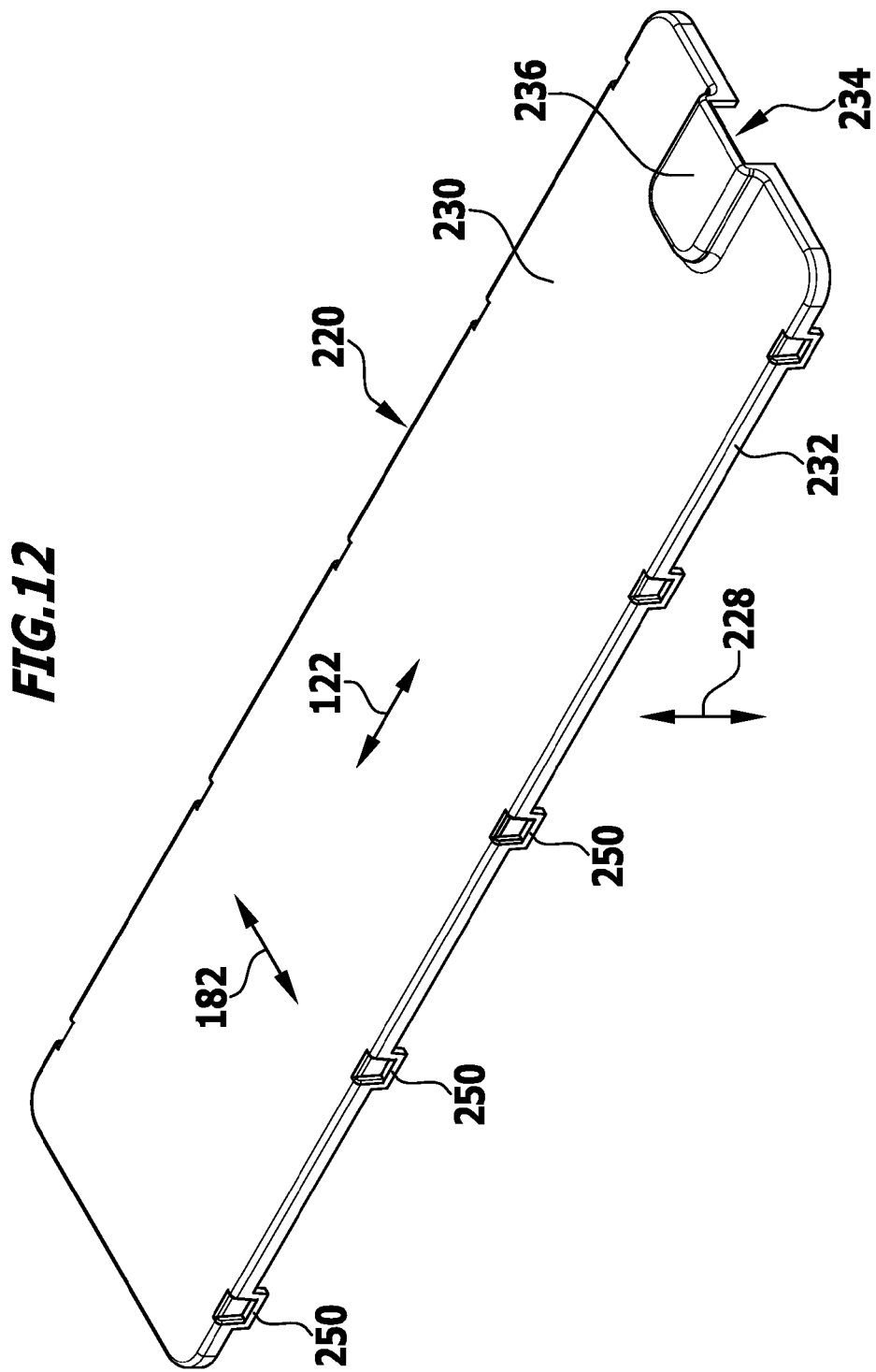
FIG. 12 shows a perspective illustration of a housing upper part of the housing in which the monitoring unit in the second embodiment of the cell contact-making system is arranged.
Figure 13:
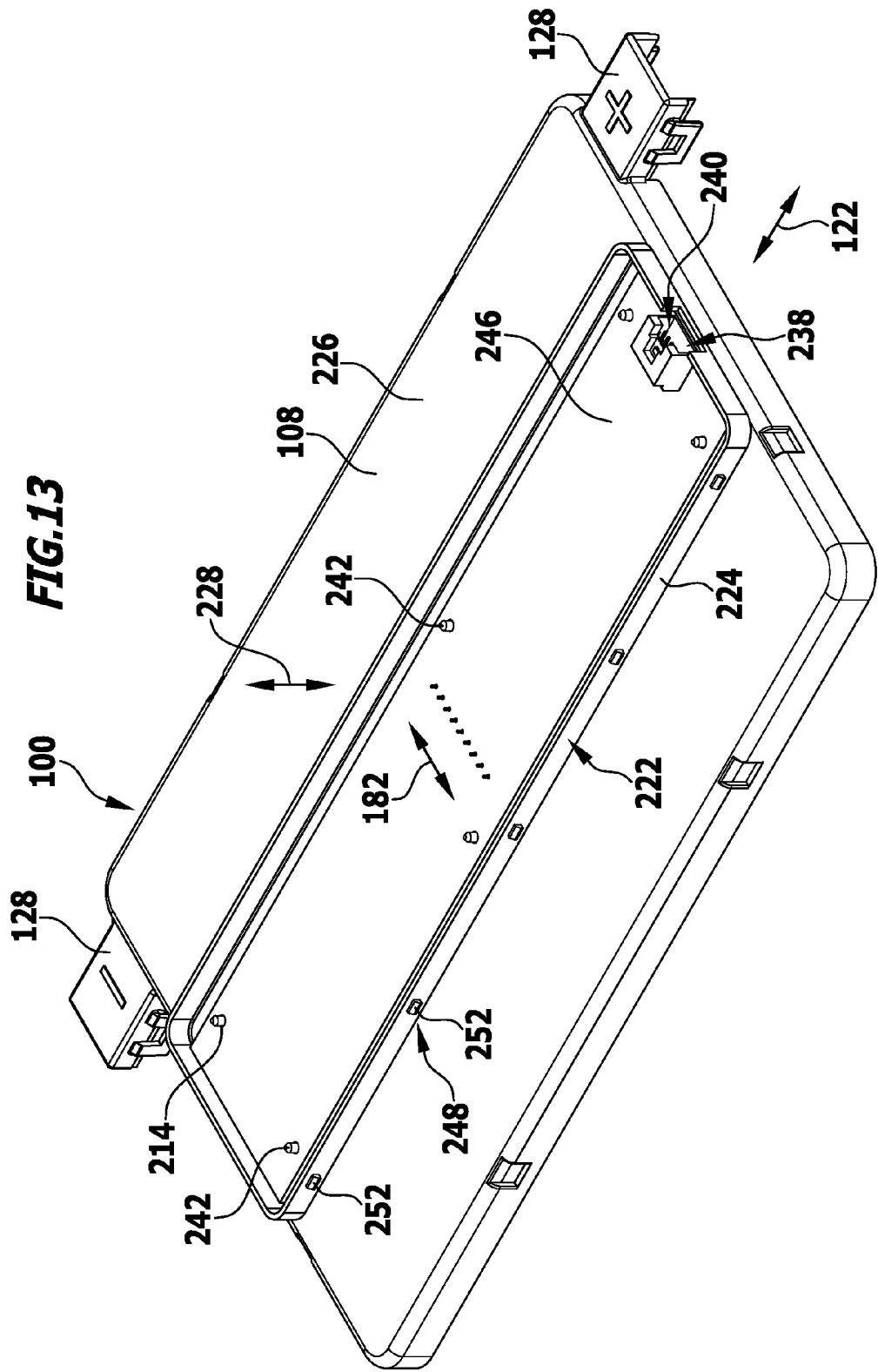
FIG. 13 shows a schematic illustration of the cell contact-making system from FIGS. 8 to 12, without the housing upper part illustrated in FIG. 12.
Figure 14:
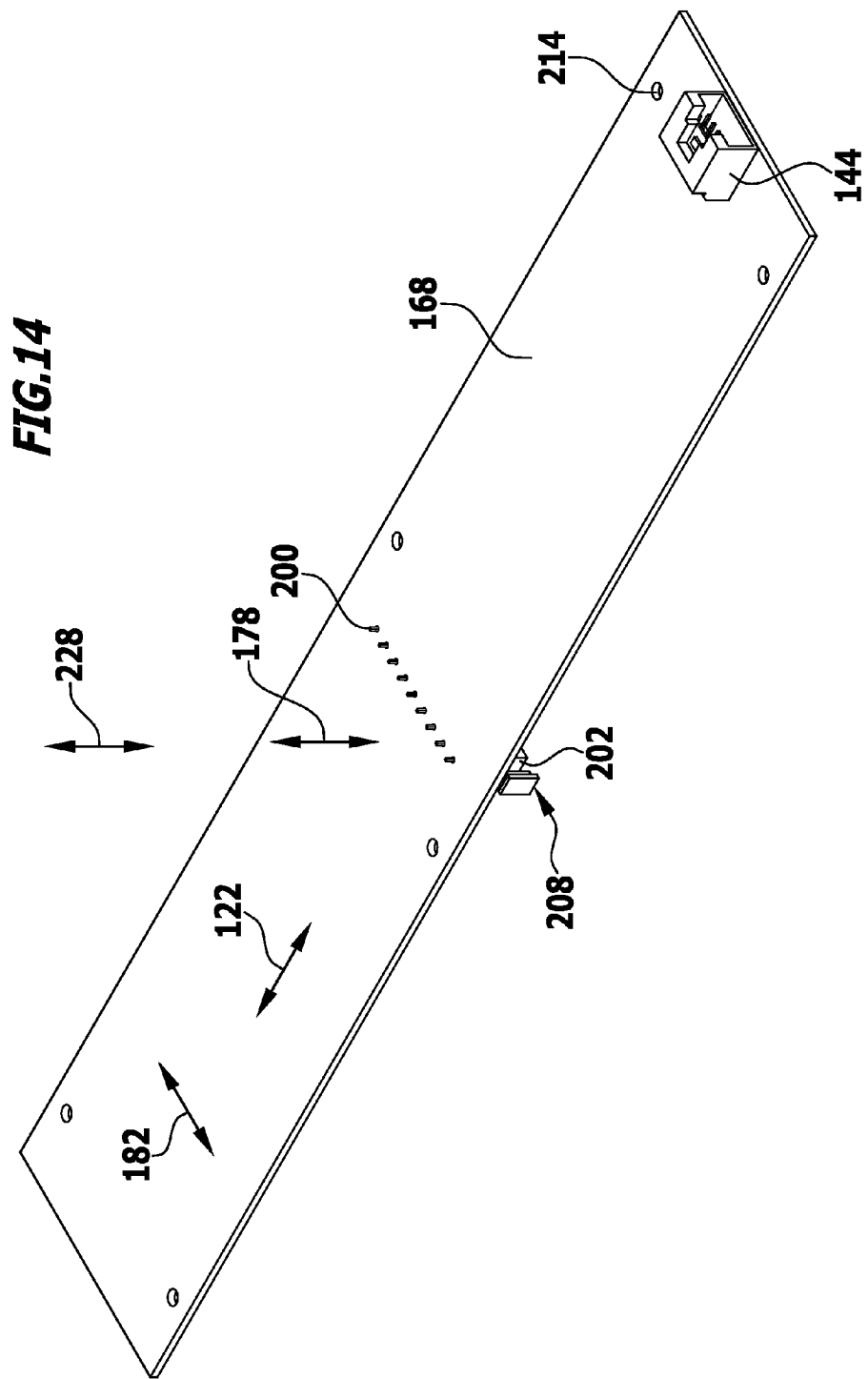
FIG. 14 shows a perspective illustration of the monitoring unit of the cell contact-making system.
Figure 15:
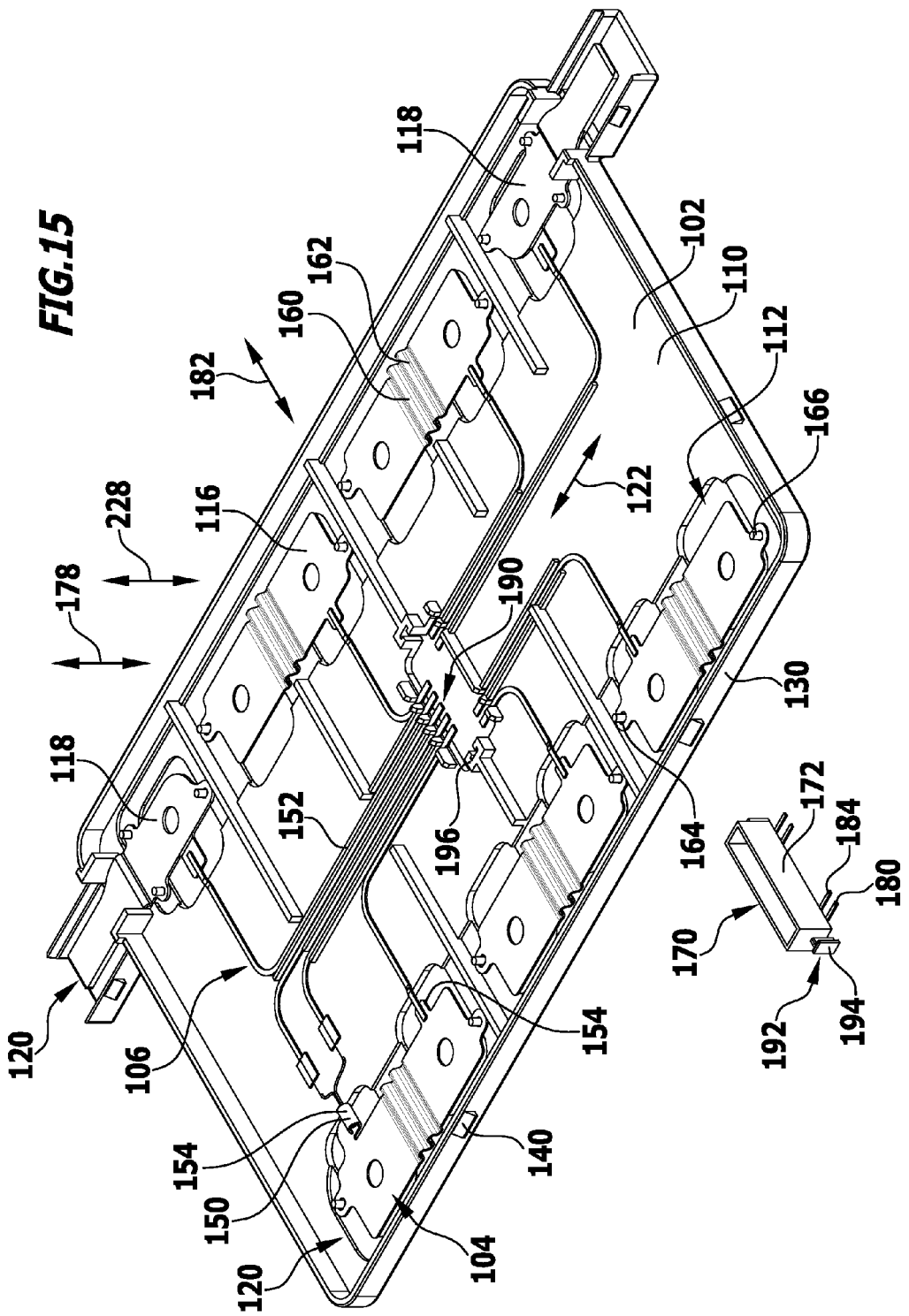
FIG. 15 shows a perspective illustration of the support element, the current conductor system and the signal conductor system of the second embodiment of the cell contact-making system from FIGS. 8 to 14 before a terminal connector housing of a signal conductor terminal connector of the cell contact-making system is fixed to the support element.
Figure 16:
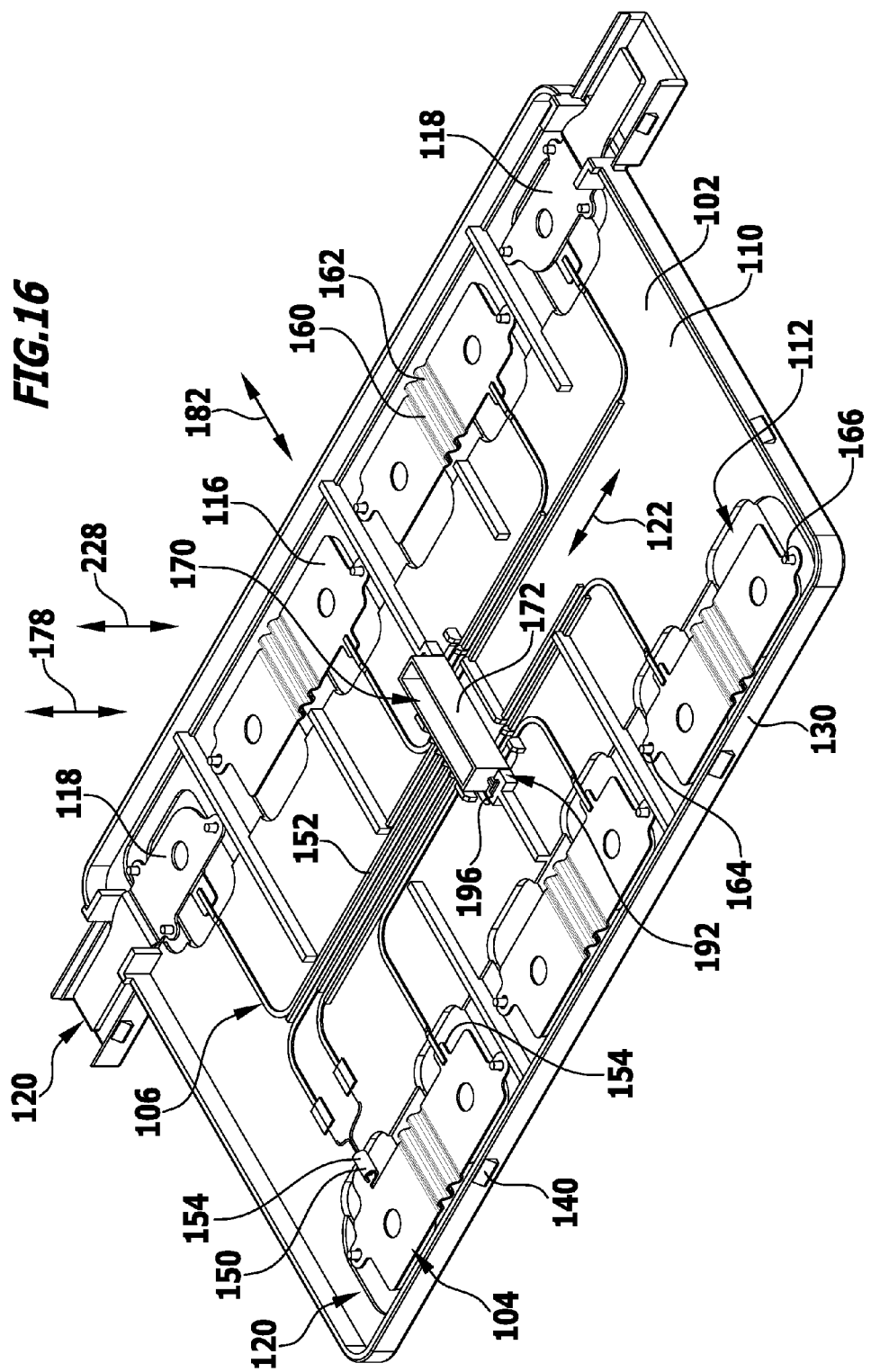
FIG. 16 shows a perspective illustration of the support element, the current conductor system and the signal conductor system corresponding to FIG. 15 after the terminal connector housing has been fixed to the support element.
Figure 17:
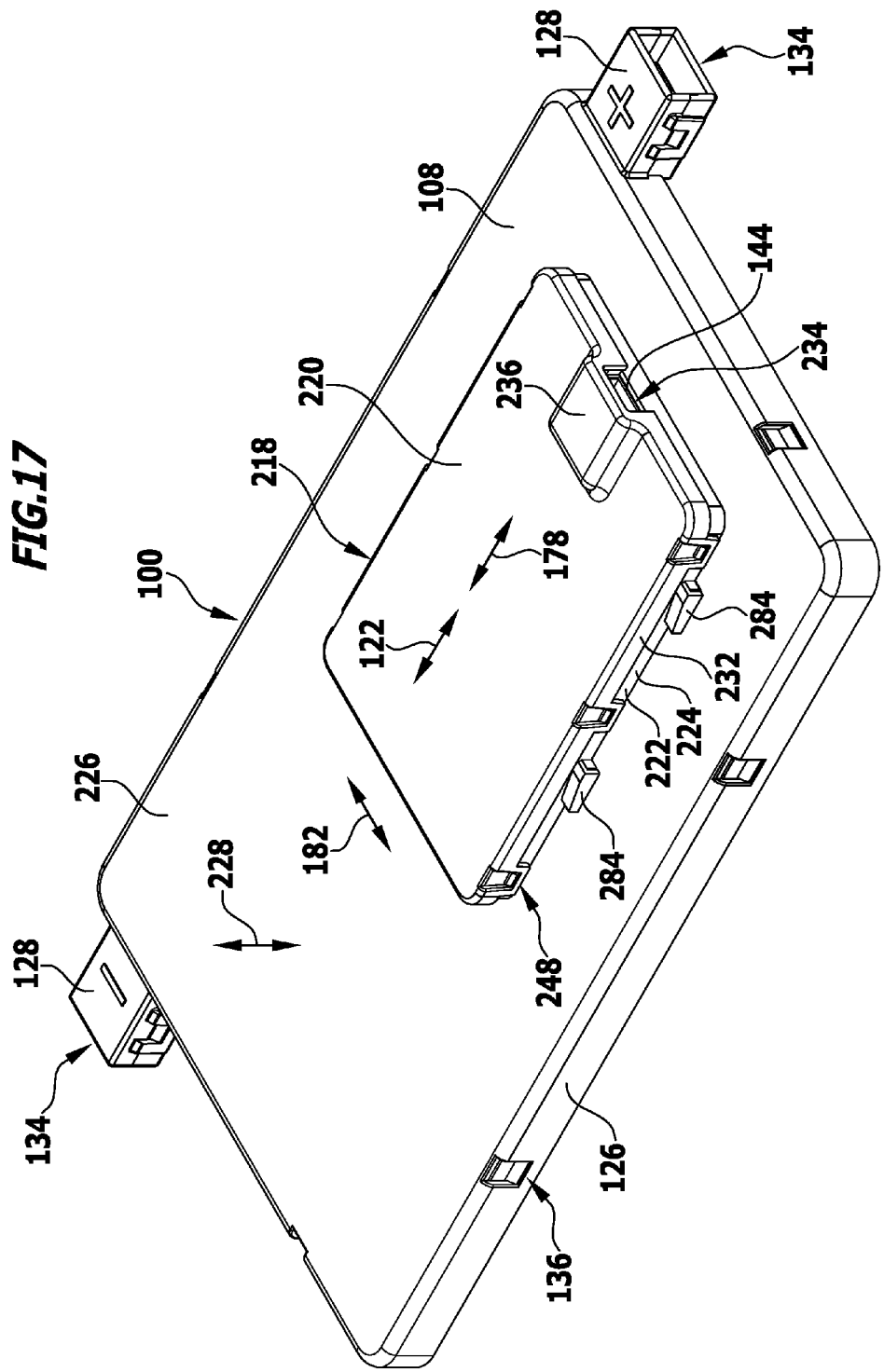
FIG. 17 shows a perspective illustration of a third embodiment of the cell contact-making system, in which the monitoring unit is arranged in a housing which is produced separately from the cover element and is fixed releasably to the cover element.
Figure 18:
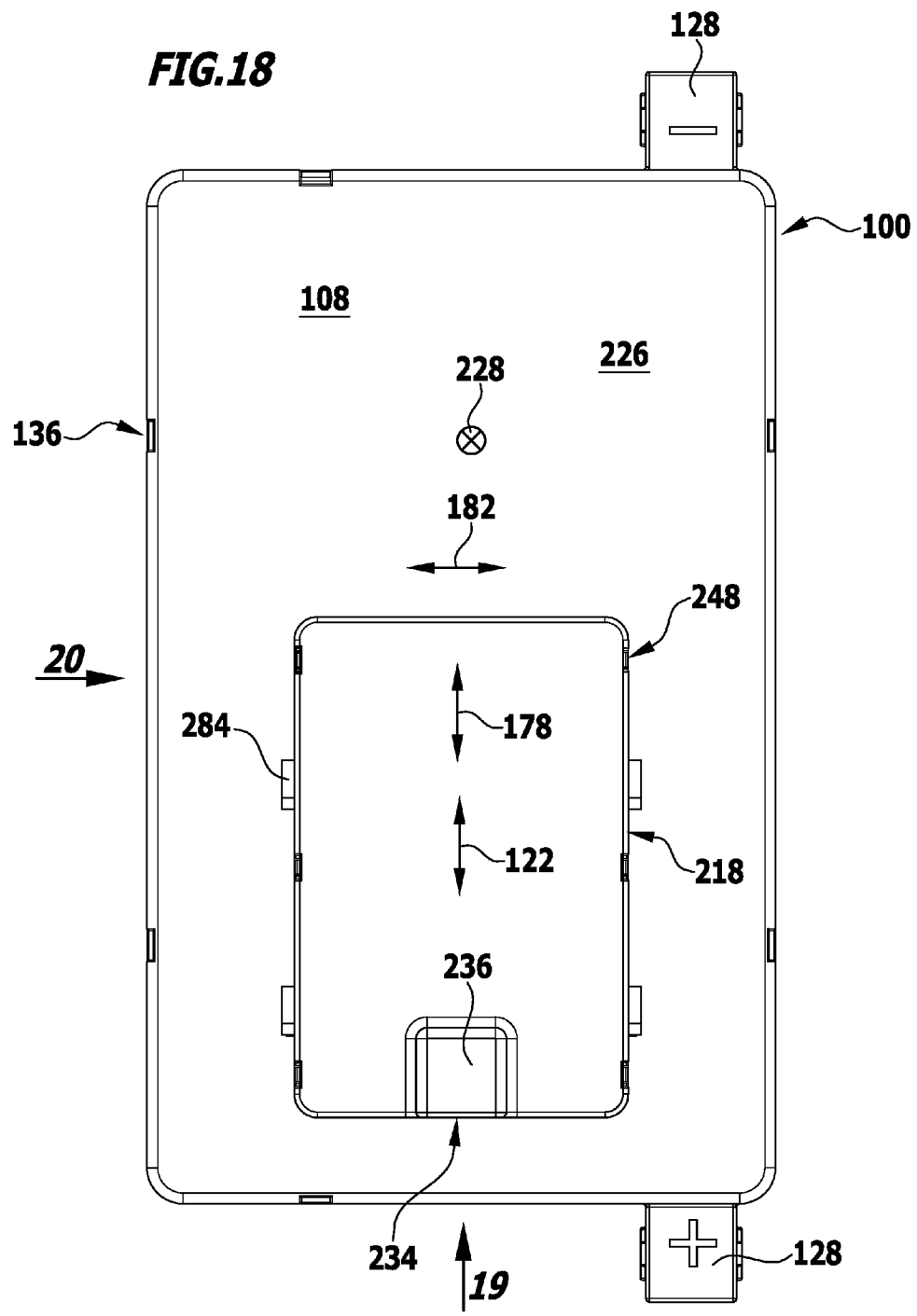
FIG. 18 shows a plan view from above of the cell contact-making system from FIG. 17.
Figure 19:
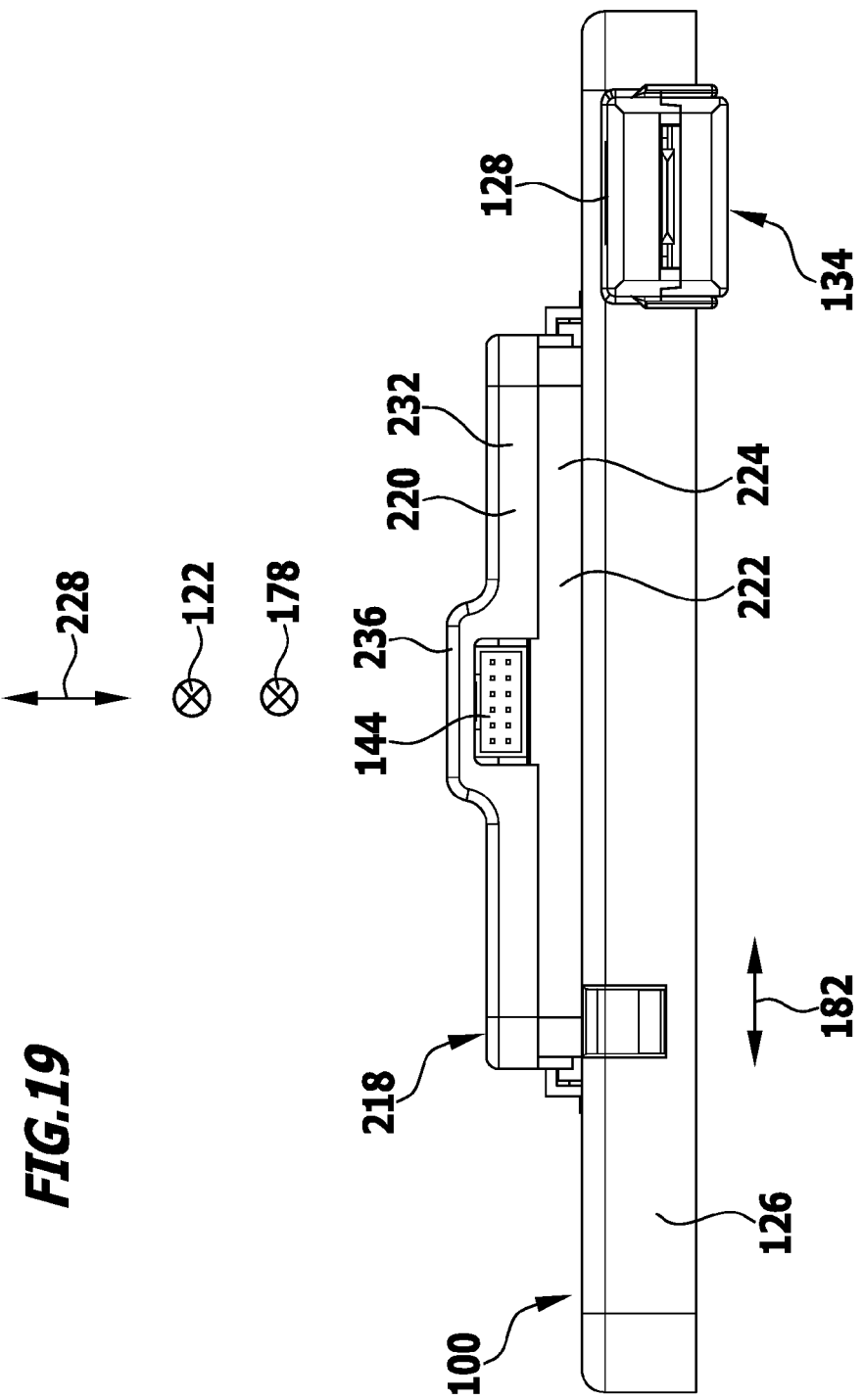
FIG. 19 shows a front view of the cell contact-making system from FIG. 18, with the direction of view in the direction of the arrow 19 in FIG. 18.
Figure 20:
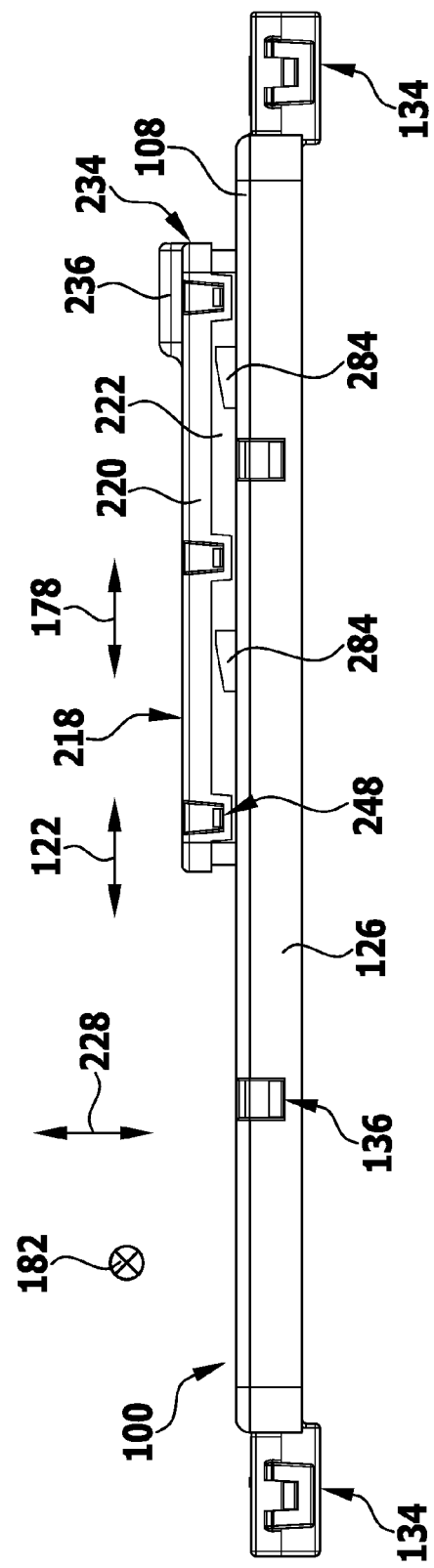
FIG. 20 shows a side view of the cell contact-making system from FIGS. 18 and 19, with the direction of view in the direction of the arrow 20 in FIG. 18.

The housing upper part 220 illustrated individually in FIG. 12 includes for example a preferably substantially rectangular top plate 230 from the edge whereof an edge region 232 extends downwards, as seen in the vertical direction 228, towards the housing lower part 222.

The housing upper part 220 further has a passage opening 234 having an elevated portion 236 that adjoins the passage opening 234.

At a point corresponding to the position of the passage opening 234 in the housing upper part 220, the edge region 224 of the housing lower part 222 is also provided with a passage opening 238, which in the assembled condition of the cell contact-making system 100 forms, together with the passage opening 234 in the housing upper part 220, a passage duct 240 through which the signal terminal connector 144 of the monitoring unit 167 is accessible from outside the monitoring unit housing 218, in order in particular to connect a connection line to the signal terminal connector 144.

Within the portion of the upper side 226 of the cover element 108 that is surrounded by the edge region 224 of the housing lower part 222, there are further provided a plurality of positioning elements 242, which in the assembled condition of the cell contact-making system 100 extend through respectively associated positioning openings 214 in the monitoring unit 167 in order to position the monitoring unit 167 in a desired position in the monitoring unit housing 218 in respect of the longitudinal direction 122 and the transverse direction 182.

Figure 10:
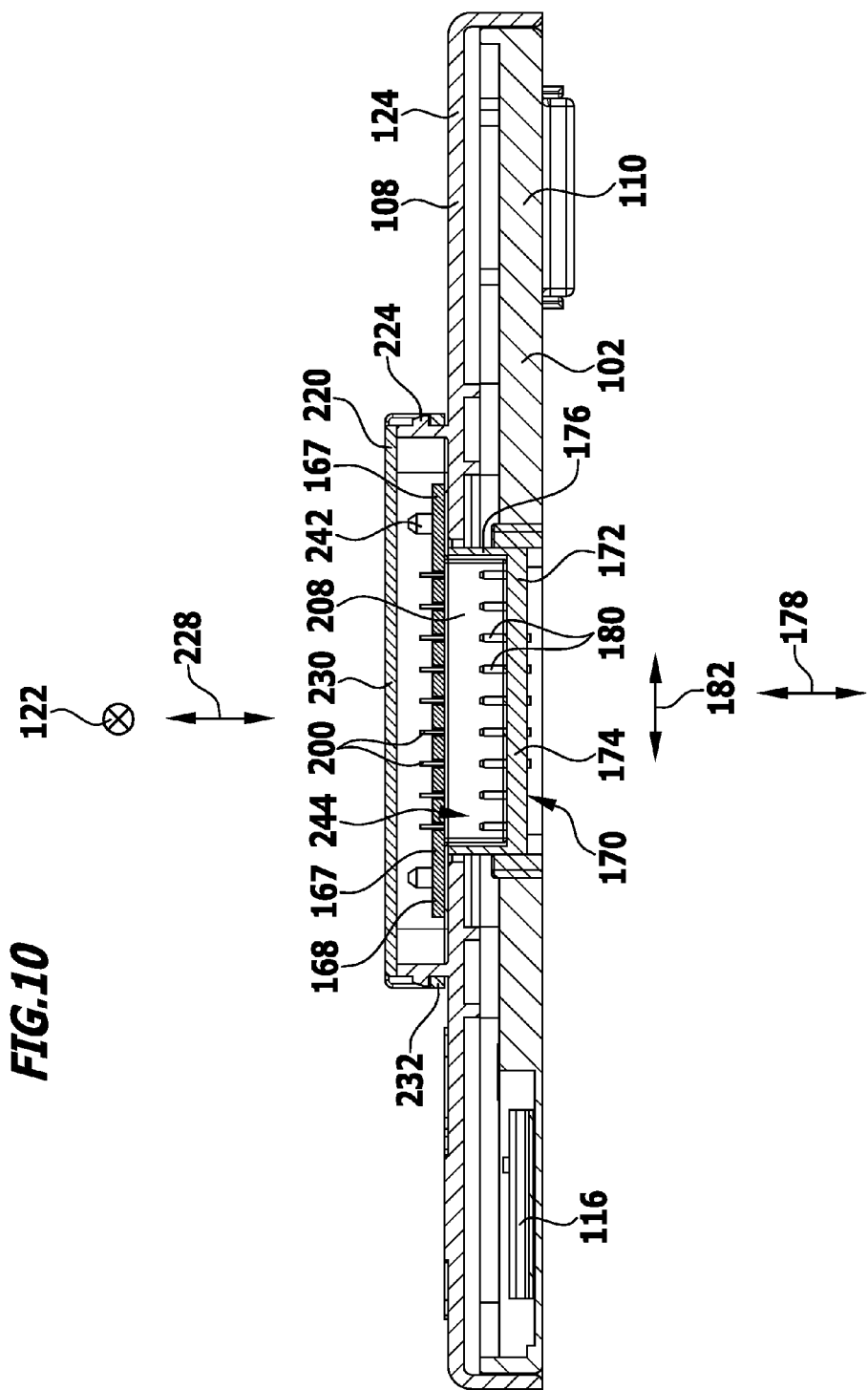
FIG. 10 shows a cross section through the cell contact-making system from FIG. 9, along the line 10-10 in FIG. 9.
Figure 11:
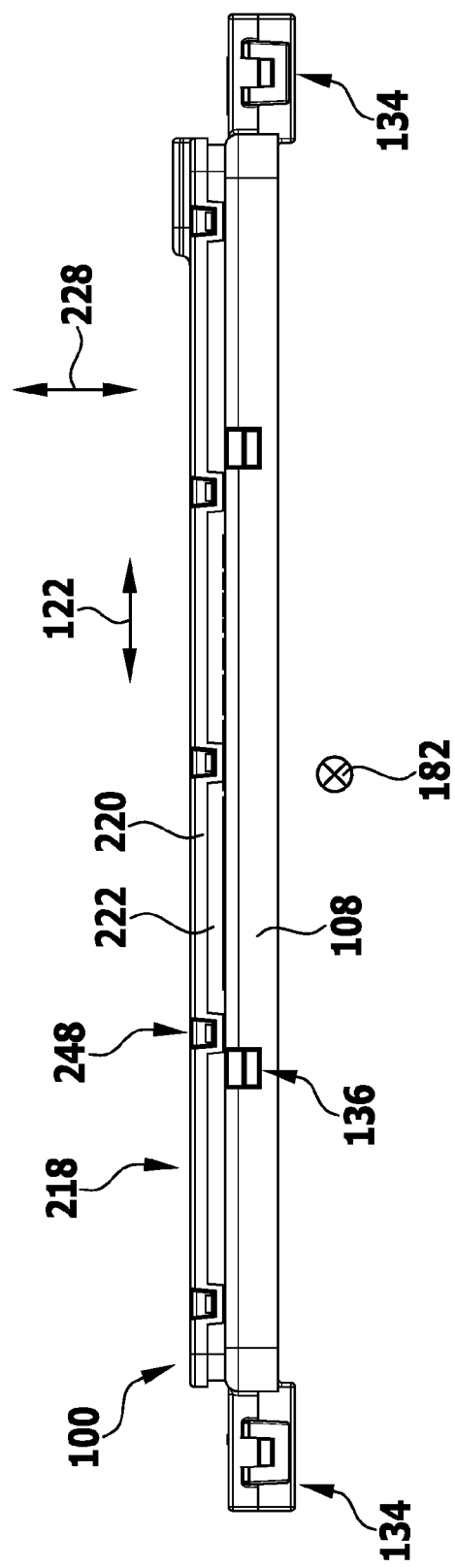
FIG. 11 shows a side view of the cell contact-making system from FIG. 9, with the direction of view in the direction of the arrow 11 in FIG. 9.

As can best be seen from the sectional illustration in FIG. 10, in this embodiment the cover element 108 has a passage opening 244 that is preferably arranged substantially centrally and through which the plug contact terminal connector 208 of the monitoring unit 167 extends, in order, together with the signal conductor terminal connector 170 of the signal conductor system 106, to form a plug connection.

In this arrangement, the monitoring unit 167 may lie on the upper side 226 of the cover element 108 by means of its lower side facing the cover element 108, or indeed may be spaced in the vertical direction 228 from the upper side 226 of the cover element 108.

In contrast to the first embodiment, in the case of this second embodiment of the cell contact-making system 100 the signal terminal connector 144 of the monitoring unit 167 is not arranged on the lower side of the monitoring unit 167 facing the support element 102, but is arranged on the upper side 246 of the monitoring unit 167 remote from the support element 102 and the cover element 108.

In particular, it may be provided for the signal terminal connector 144 of the monitoring unit 167 to be received in the region of the raised portion 236 of the housing upper part 220 in the monitoring unit housing 218.

So that the housing upper part 220 can be releasably fixed to the housing lower part 222, there is preferably provided a latching device 248 that includes one or more latching elements 250 provided on the housing upper part 220 and one or more latching elements 252 provided on the housing lower part 222.

The latching elements 250 on the housing upper part and the latching elements 252 on the housing lower part are arranged at mutually corresponding points on the edge region 232 of the housing upper part 220 and the edge region 224 of the housing lower part 222, and are latched to one another when the housing upper part 220 is placed on the housing lower part 222, with the result that the housing upper part 220 is held releasably on the housing lower part 222 by means of the latching device 248.

The housing upper part 220 of the monitoring unit housing 218 preferably includes an electrically non-conductive material, in particular a synthetic material, for example PBT (polybutylene terephthalate), PP (polypropylene), PA (polyamide), ABS (acrylonitrile butadiene styrene) and/or LCP (liquid crystal polymer), and is preferably formed substantially entirely from a synthetic material of this kind.

During assembly of the second embodiment of the cell contact-making system 100, the procedure is for example such that the cover element 108, with the housing lower part 222, is first placed, without the housing upper part 220 or the monitoring unit 167, on the support element 102 and is connected thereto, preferably releasably.

Then, the monitoring unit 167 is inserted into the monitoring unit housing 218 from above, in the vertical direction 228. During this, at the same time the plug connection between the plug contact terminal connector 208 of the monitoring unit 167 and the signal conductor terminal connector 170 of the signal conductor system 106 is made through the passage opening 244 in the cover element 108.

Finally, the housing upper part 220 is placed on the housing lower part 222 and connected thereto, in particular by being latched, with the result that the housing upper part 220 covers the monitoring unit 167 and protects it from undesired contact.

In order to remove the monitoring unit 167 from the cell contact-making system 100, for the purposes of maintenance and/or repair, all that needs to be done is for the housing upper part 220 of the monitoring unit housing 218 to be released from the housing lower part 222 and for the monitoring unit 167 to be taken off the signal conductor terminal connector 170 of the signal conductor system 106.

In this embodiment it is not therefore necessary to release the cover element 108 from the support element 102 in order to remove the monitoring unit 167. This provides the advantage that even while the monitoring unit 167 is being removed the current conductor system 104 and the signal conductor system 106 of the cell contact-making system 100 remain protected by the cover element 108 from undesired contact.

Otherwise, the second embodiment, illustrated in FIGS. 8 to 16, of the cell contact-making system 100 corresponds, as regards its structure, functioning and manner of production, to the first embodiment illustrated in FIGS. 1 to 7, so in this respect reference is made to the description thereof above.

A third embodiment of the cell contact-making system 100, illustrated in FIGS. 17 to 25, differs from the second embodiment described above in that the housing lower part 222 of the monitoring unit housing 218 is not formed in one piece with the cover element 108 but takes the form of a component produced separately from the cover element 108.

Figure 23:
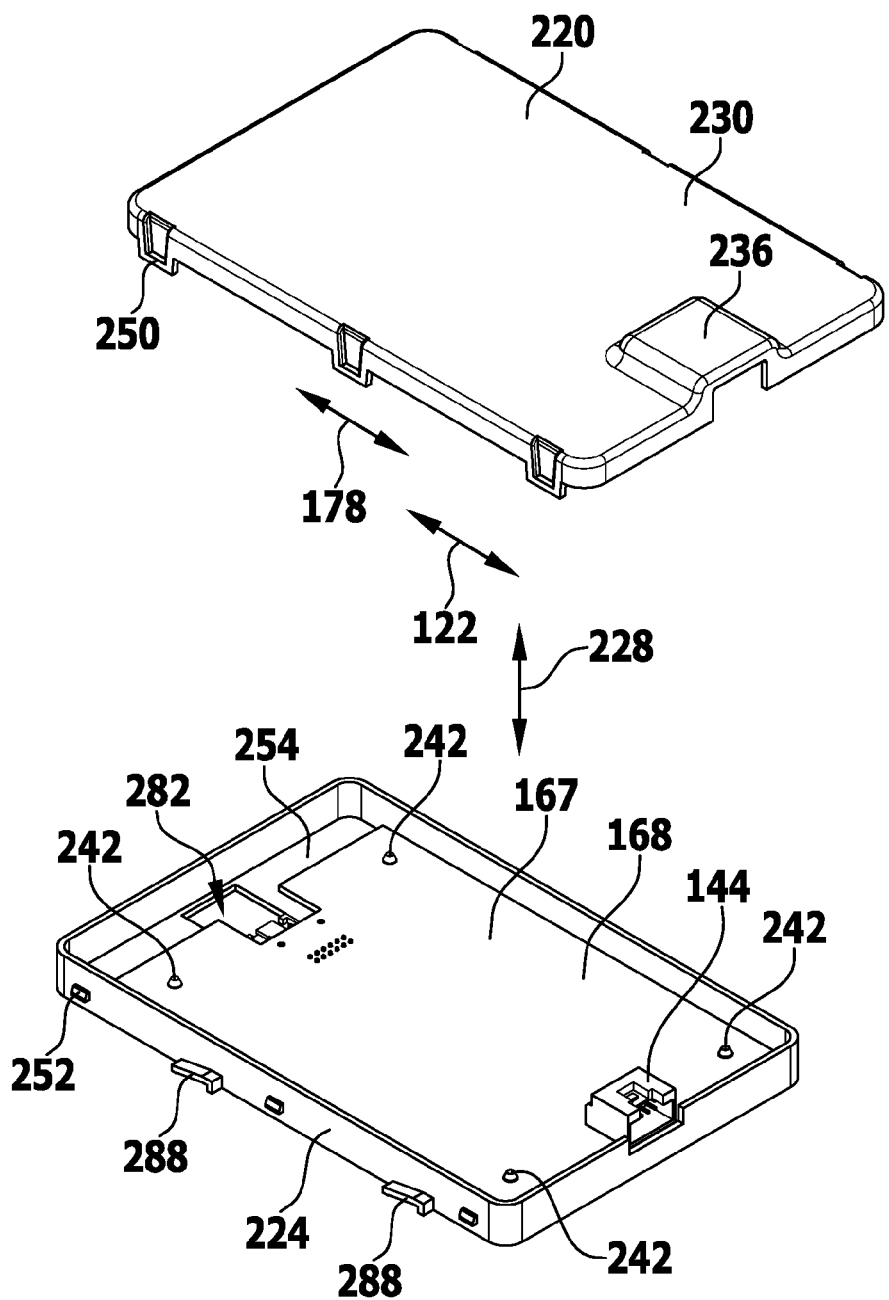
FIG. 23 shows a perspective exploded illustration of the housing for the monitoring unit from FIG. 22, wherein a housing upper part of the housing has been lifted away from a housing lower part of the housing.

Thus, in this embodiment the housing lower part 222 includes, in addition to the edge region 224, a preferably substantially rectangular base plate 254 which, in the assembled condition of the cell contact-making system 100, faces the cover element 108 (see in particular FIG. 23).

In the case of the third embodiment, the housing lower part 222 is preferably formed from an electrically insulating material, in particular a synthetic material, for example PBT (polybutylene terephthalate), PP (polypropylene), PA (polyamide), ABS (acrylonitrile butadiene styrene) and/or LCP (liquid crystal polymer).

In this embodiment the plug contact terminal connector 208 of the monitoring unit 167, arranged on an underside 256 of the monitoring unit 167 that faces the base plate 254, has terminal connector pins 258 that are angled in form and each include a terminal connector portion 260 that extends in the vertical direction 228 and a contact portion 262 that extends in the longitudinal direction 122 of the cell contact-making system 100.

In this embodiment, the contact portions 262 of the terminal connector pins 258 of the plug contact terminal connector 208 of the monitoring unit 167 thus extend in a contact direction 178 that runs parallel to the plane defined by the longitudinal direction 122 and the transverse direction 182 of the support element 102.

Figure 25:
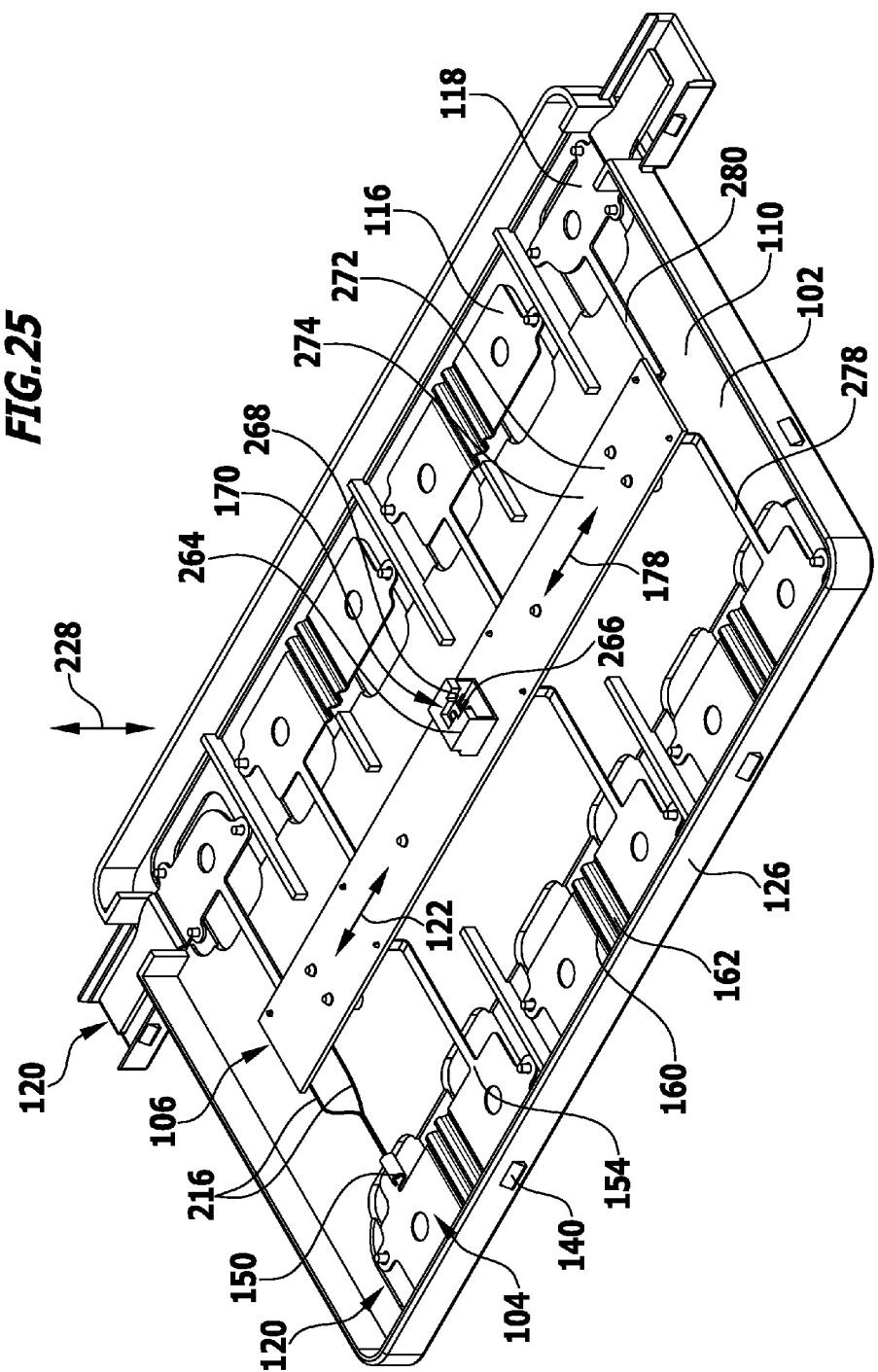
FIG. 25 shows a schematic illustration of the cell contact-making system from FIGS. 17 to 24, wherein the cover element has been removed from the support element.

As can best be seen from FIG. 25, in this embodiment the signal conductor terminal connector 170 of the signal conductor system 106 takes the form of a plug contact 264 that is in a form complementary with the plug contact terminal connector 208 of the monitoring unit 167 and whereof the terminal connector pins 266 also have contact portions 268 extending parallel to the longitudinal direction 122.

The terminal connector portions 270 of the terminal connector pins 266 of this plug contact 264 extend through respectively allocated passage openings in a printed circuit board 272 on the upper side 274 whereof the plug contact 264 is arranged.

On the lower side 276 of the printed circuit board 272, remote from the upper side 274, which in the assembled condition of the cell contact-making system faces the support element 102, conductor tracks (not illustrated) are provided, and these form a respective component of a signal conductor 152 of the signal conductor system 106 and are electrically conductively connected to a respective terminal connector pin 266 of the plug contact 264 of the signal conductor system 106, for example by soldering.

At its end remote from the respectively associated terminal connector pin 266, each conductor track of the printed circuit board 272 is electrically conductively connected, for example by soldering, to a voltage tapping element 278, for example a voltage tapping web 280, of a cell connector 116 or current terminal connector 118, or a terminal connector element 216, for example a terminal connector wire, of a temperature sensor 150.

In this arrangement, the voltage tapping elements 278 each lead from a conductor track of the printed circuit board 272 to a voltage tapping point 148 on a cell connector 116 or current terminal connector 118.

In the embodiment illustrated in the Figures, the voltage tapping elements 278 are formed for example in one piece with the respectively associated cell connector 116 or current terminal connector 118.

Each voltage tapping element 278 forms, together with the respectively associated conductor track of the printed circuit board 272, which makes an electrically conductive connection between the voltage tapping element 278 and a terminal connector pin 266 of the plug contact 264, a respective voltage tapping line 156 of the signal conductor system 106.

Further, each terminal connector element 216 of a temperature sensor 150 forms, together with the respectively associated conductor track of the printed circuit board 272, which makes an electrically conductive connection between the respective terminal connector element 216 and a terminal connector pin 266 of the plug contact 264, a respective temperature measuring line 158 of the signal conductor system 106.

Figure 24:
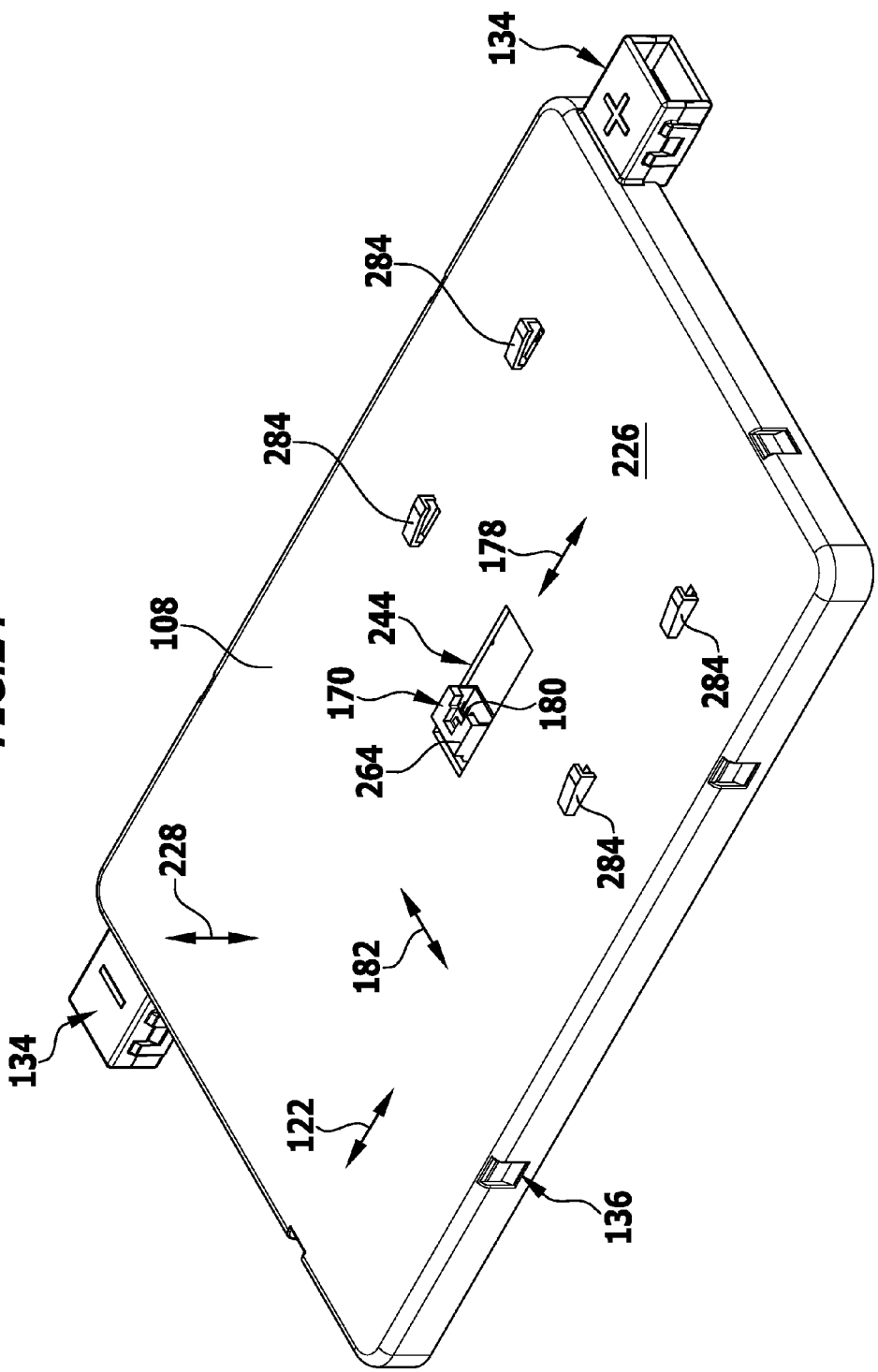
FIG. 24 shows a perspective illustration of the cell contact-making system from FIGS. 17 to 23, wherein the housing of the monitoring unit has been removed from the cover element and a signal conductor terminal connector of the signal conductor system extends through a passage opening in the cover element.

As can best be seen from FIG. 24, the signal conductor terminal connector 170, which takes the form of a plug contact 264, of the signal conductor system 106 extends through a passage opening 244 in the cover element 108.

The passage opening 244 extends in front of the access opening of the signal conductor terminal connector 170 in the contact direction 178 by an amount such that the plug contact terminal connector 208 of the monitoring unit 167 is inserted into the passage opening 244 in front of the signal conductor terminal connector 170 and can then, by being displaced in the contact direction 178, be brought into plug contact with the signal conductor terminal connector 170.

Figure 21:
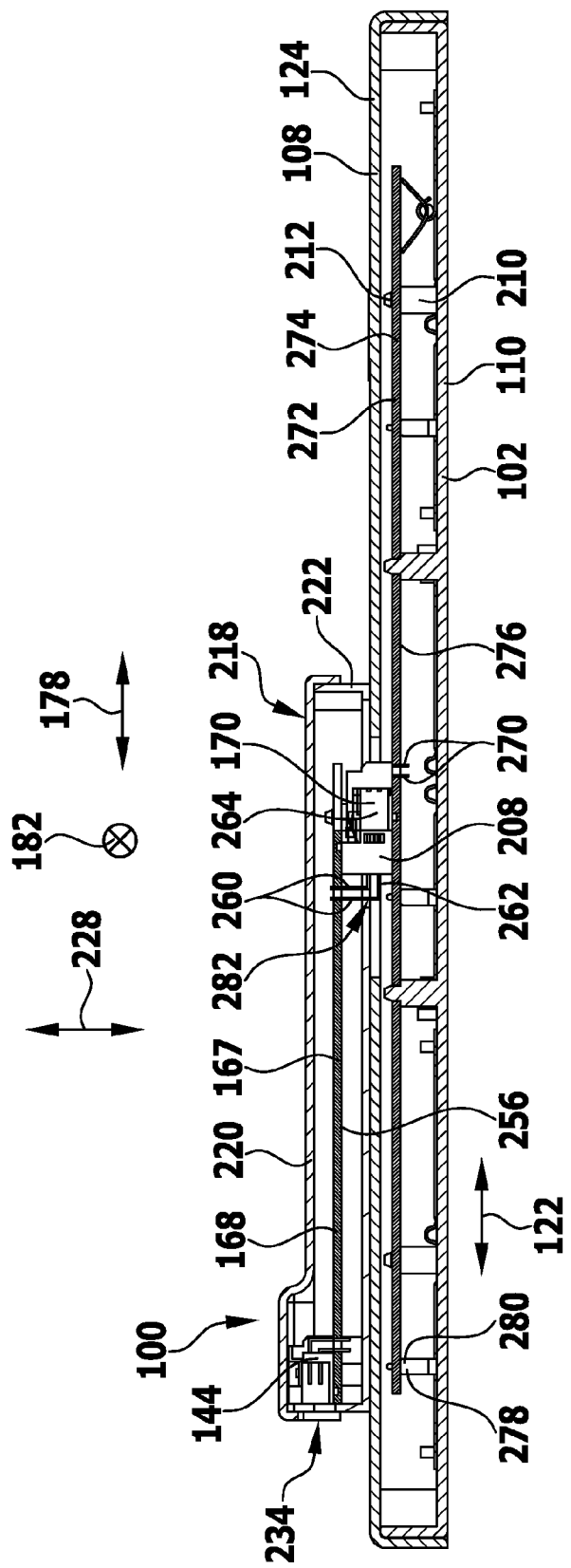
FIG. 21 shows a longitudinal section through the cell contact-making system from FIGS. 18 to 20.
Figure 22:
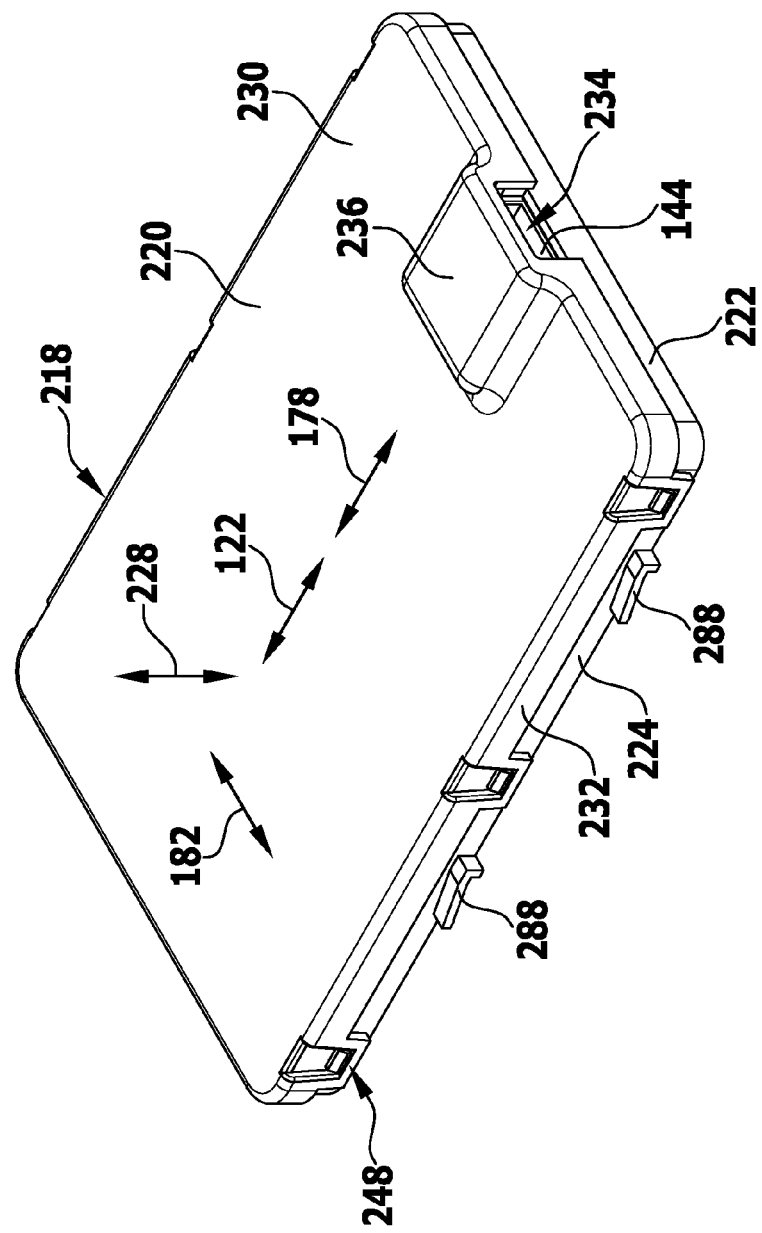
FIG. 22 shows a perspective illustration of the housing in which the monitoring unit in the third embodiment of the cell contact-making system is arranged.

During this, the plug contact terminal connector 208 of the monitoring unit 167 extends through a passage opening 282 in the housing lower part 222 of the monitoring unit housing 218 (see in particular FIG. 21).

In order to guide displacement of the monitoring unit housing 218 in the contact direction 178, relative to the cover element 108, a plurality of guide elements 284, preferably four, on the cover element are provided on the upper side 226 of the cover element 108 and cooperate with a respective guide element 288 on the housing that is arranged in the edge region 224 of the housing lower part 222 of the monitoring unit 218, in order to enable the monitoring unit housing 218 to be displaced in a guided manner in the contact direction 178, relative to the cover element 108.

In this context, it may be provided for the guide elements 284 on the cover element and the guide elements 288 on the housing to be releasably fixed, in particular being latched, to one another in the operative position of the monitoring unit housing 218, in which the plug contact terminal connector 208 of the monitoring unit 167 is in plugged connection with the signal conductor terminal connector 170 of the signal conductor system 106.

During assembly of the third embodiment of the cell contact-making system 100, the monitoring unit 167 is placed on the housing lower part 222 and at the same time positioned by means of the positioning elements 242 of the monitoring unit housing 218 in the desired manner in the longitudinal direction and transverse direction of the monitoring unit housing 218, wherein the plug contact terminal connector 208 of the monitoring unit 167 extends through the passage opening 282 in the housing lower part 222 (see FIG. 23).

Then, the housing upper part 220 is placed on the housing lower part 222 and connected thereto, in particular by being latched by means of the latching device 248, with the result that the housing upper part 220 covers the monitoring unit 167 and protects it from undesired contact.

As a result, damage to the monitoring unit 167 is reliably prevented even if the monitoring unit housing 218 is released from the cover element 108 of the cell contact-making system 100.

Then, the monitoring unit housing 218 is placed on the upper side 226 of the cover element 108 such that the plug contact terminal connector 208 of the monitoring unit 167 extends into the passage opening 244 in the cover element 108, and the plug contact terminal connector 208 and guide elements 288 on the housing are spaced in the contact direction 178 from the signal conductor terminal connector 170 of the signal conductor system 106 and from the guide elements 284 on the cover element such that, by displacing the monitoring unit housing 218 in the contact direction 178, a plug connection is producible between the plug contact terminal connector 208 and the signal conductor terminal connector 170, and the guide elements 288 on the housing are engageable with the guide elements 284 on the cover element and preferably latchable thereto.

For the purposes of maintenance and/or repair, the monitoring unit housing 218 can simply be displaced in the opposite direction and thus released from the cover element 108, wherein at the same time the plug connection between the plug contact terminal connector 208 of the monitoring unit 167 and the signal conductor terminal connector 170 of the signal conductor system 106 is disconnected.

Otherwise, the third embodiment, illustrated in FIGS. 17 to 25, of the cell contact-making system 100 corresponds, as regards its structure, functioning and manner of production, to the second embodiment illustrated in FIGS. 8 to 16, so in this respect reference is made to the description thereof above.

The invention claimed is:

1. A cell contact-making system for an electrochemical device which includes a plurality of electrochemical cells, wherein the cell contact-making system includes
   a current conductor system having one or more cell connectors, for electrically conductively connecting cell terminals of different electrochemical cells,
   a signal conductor system having one or more signal conductors for electrically conductively connecting a respective signal source to a signal conductor terminal connector of the cell contact-making system, and
   a monitoring unit for monitoring signals from the signal sources,
   wherein the monitoring unit includes a plug contact terminal connector which is directly connectable by a plug connection to the signal conductor terminal connector of the signal conductor system.

2. The cell contact-making system according to claim 1, wherein the signal conductor terminal connector includes a signal plug or a signal socket, and in that the monitoring unit includes a signal socket that is complementary with the signal plug of the signal conductor terminal connector, or a signal plug that is complementary with the signal socket of the signal conductor terminal connector.

3. The cell contact-making system according to claim 1, wherein the monitoring unit includes a signal terminal connector for connecting a connection line to a monitoring unit of another cell contact-making system or to a central monitoring device.

4. The cell contact-making system according to claim 1, wherein the signal conductor terminal connector of the signal conductor system includes a terminal connector housing, wherein at least one terminal connector pin is fixed to the terminal connector housing, for connecting a signal conductor.

5. The cell contact-making system according to claim 4, wherein at least one terminal connector pin takes a curved form.

6. The cell contact-making system according to claim 4, wherein the terminal connector housing of the signal conductor terminal connector includes a receptacle for a terminal connector housing of the plug contact terminal connector, wherein at least one terminal connector pin is fixed to the terminal connector housing of the plug contact terminal connector.

7. The cell contact-making system according to claim 1, wherein the cell contact-making system includes a support element that carries the current conductor system and the signal conductor system, and in that the signal conductor terminal connector is fixed to the support element.

8. The cell contact-making system according to claim 1, wherein the cell contact-making system includes a support element that carries the current conductor system and the signal conductor system, and a cover element that is releasably fixed to the support element, wherein the current conductor system, the signal conductor system and the monitoring unit are arranged at least partly between the support element and the cover element.

9. The cell contact-making system according to claim 8, wherein the support element and/or the cover element include/includes at least one positioning element that engages with the monitoring unit.

10. The cell contact-making system according to claim 1, wherein the cell contact-making system includes a cover element that, in the assembled condition of the cell contact-making system, is arranged on the side of the current conductor system and the signal conductor system remote from the cell terminals of the electrochemical device.

11. The cell contact-making system according to claim 10, wherein the signal conductor terminal connector of the signal conductor system extends at least partly through the cover element.

12. The cell contact-making system according to claim 10, wherein the monitoring unit is arranged in a monitoring unit housing.

13. The cell contact-making system according to claim 12, wherein the monitoring unit housing takes the form of an element that is produced separately from the cover element.

14. The cell contact-making system according to claim 12, wherein the monitoring unit housing includes a housing lower part and a housing upper part.

15. The cell contact-making system according to claim 14, wherein the housing lower part of the monitoring unit housing is formed in one piece with the cover element.

* * * * *